(12) United States Patent
Park et al.

(10) Patent No.: US 10,398,260 B2
(45) Date of Patent: Sep. 3, 2019

(54) OVEN AND CONTROL METHOD THEREOF

(71) Applicant: SAMSUNG ELECTRONICS CO., LTD., Suwon-si, Gyeonggi-do (KR)

(72) Inventors: Sang Jun Park, Yongin-si (KR); Boo Keun Yoon, Yongin-si (KR); Han Jun Sung, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 191 days.

(21) Appl. No.: 15/260,581

(22) Filed: Sep. 9, 2016

(65) Prior Publication Data

US 2017/0261213 A1 Sep. 14, 2017

Related U.S. Application Data

(60) Provisional application No. 62/307,059, filed on Mar. 11, 2016.

(30) Foreign Application Priority Data

Apr. 11, 2016 (KR) .................. 10-2016-0043938

(51) Int. Cl.
*H05B 1/02* (2006.01)
*A47J 37/06* (2006.01)
(Continued)

(52) U.S. Cl.
CPC ....... *A47J 37/0664* (2013.01); *F21V 23/0464* (2013.01); *F24C 7/085* (2013.01); *F24C 15/024* (2013.01); *G01J 1/4214* (2013.01); *H04N 5/2257* (2013.01); *F21W 2131/307* (2013.01); *F24C 15/04* (2013.01)

(58) Field of Classification Search
CPC .... H05B 1/0263; H05B 3/0071; H05B 3/008; H04N 5/2257; G01J 1/44; A47L 37/0664; F21V 23/0464; F21V 33/0044; F24C 15/003
USPC ....... 219/502, 506, 494, 497, 412–414, 388, 219/711, 712, 702
See application file for complete search history.

(56) References Cited

U.S. PATENT DOCUMENTS 10,027,866 B2 * 7/2018 Carlotto .............. G06F 17/3028

FOREIGN PATENT DOCUMENTS

EP 2813764 12/2014
KR 10-2009-0044734 5/2009
(Continued)

OTHER PUBLICATIONS

English Abstract of European Patent Application 2813764, dated Dec. 17, 2014.
(Continued)

*Primary Examiner* — Mark H Paschall
(74) *Attorney, Agent, or Firm* — Staas & Halsey LLP

(57) ABSTRACT

Disclosed herein is an oven. The oven includes a case having a cooking chamber therein, a door unit connected to the case, configured to open or close the cooking chamber, and having a transparent portion configured to enable a user to see the inside of the cooking chamber, a handle protruding from the door unit to the outside, and a camera module configured to photograph the inside of the cooking chamber, and disposed to be biased toward one end of the handle from the center in longitudinal direction of the handle.

23 Claims, 30 Drawing Sheets

(51) Int. Cl.
*F21V 23/04* (2006.01)
*H04N 5/225* (2006.01)
*F24C 7/08* (2006.01)
*F24C 15/02* (2006.01)
*G01J 1/42* (2006.01)
*F24C 15/04* (2006.01)
*F21W 131/307* (2006.01)

(56) References Cited

FOREIGN PATENT DOCUMENTS

KR 10-2014-0039733 4/2014
WO 2016/034295 A1 3/2016

OTHER PUBLICATIONS

English Abstract of International Patent Application WO2016/034295, dated Mar. 10, 2016.

* cited by examiner

OVEN AND CONTROL METHOD THEREOF

CROSS-REFERENCE TO RELATED APPLICATION

This application claims the benefit of U.S. Patent Application Ser. No. 62/307,059, filed on Mar. 11, 2016 in the U.S. Patent and Trademark Office, and Korean Patent Application No. 10-2016-0043938, filed on Apr. 11, 2016 in the Korean Intellectual Property Office, the disclosures of which are incorporated herein by reference.

BACKGROUND

1. Field

Embodiments of the present disclosure relate to an oven and a control method thereof, and more particularly, to a camera module to observe the inside of an oven.

2. Description of the Related Art

In general, an oven is equipment to cook food by including a cooking chamber, a heating device to apply heat to the cooking chamber, and a circulation fan to circulate heat generated by the heating device in the inside of the cooking chamber.

The oven, which is cooking equipment of sealing up and heating a cooking material to cook it, is classified into an electric oven, a gas oven, and an electronic oven (also, called a microwave). The electric oven uses an electric heater as a heat source, and the gas oven and the microwave use heat generated by gas and friction heat of water molecules, respectively, as heat sources.

During cooking through the oven, there are many cases in which a user needs to look into the inside of the oven in order to check a cooking state or to add spices. In these cases, the user should go to the oven to look into the transparent window or open the oven door, which bothers the user.

Particularly, if there occurs a situation at which the user should check the cooking progress of the oven when he/she is preparing another dish or entertaining guests, it would trouble the user.

SUMMARY

Therefore, it is an aspect of the present disclosure to provide an oven of enabling a user to easily observe the cooking process of food during cooking through the oven.

It is another aspect of the present disclosure to provide an oven having a camera module that can be prevented from being damaged by heat from the cooking chamber.

It is another aspect of the present disclosure to provide an oven having a camera module that is installed in a handle and can be prevented from being contaminated (made dirty) by a user's hand.

It is another aspect of the present disclosure to provide an oven having a camera module that can photograph the cooking chamber clearly through a transparent portion.

It is another aspect of the present disclosure to provide an oven with an enhanced assembly of a case, a door unit, and a handle for easy maintenance and repair.

It is another aspect of the present disclosure to provide an oven capable of acquiring a clear image of the cooking chamber through a camera by sensing an illuminance of an area around the camera to brightly control an illuminance of a light source installed in a door unit and turned on/off according to the result of the sensing, and a control method of the oven.

It is another aspect of the present disclosure to provide an oven of enabling a distant user to control cooking of food accommodated therein, by transmitting image information of the cooking chamber acquired by a camera to an external device through a network to enable the user to check the cooking chamber and to input a command related to the control of the oven through the external device, and a control method of the oven.

In accordance with one aspect of the present disclosure, an oven includes a case having a cooking chamber therein, a door unit connected to the case, configured to open or close the cooking chamber, and having a transparent portion configured to enable a user to see the inside of the cooking chamber, a handle protruding from the door unit to the outside, and a camera module configured to photograph the inside of the cooking chamber, and disposed to be biased toward one end of the handle from the center in longitudinal direction of the handle.

The camera module may be in a depression in an outer surface of the handle.

The door unit may include a light source installed in the inside of the door unit.

The transparent portion may include an anti-reflection coating layer.

The transparent portion may include a mirror glass coating layer.

The mirror glass coating layer may include a masking portion subject to a masking process at an area corresponding to a photographing area of the camera module.

The Oven may further include a microcomputer configured to control the camera module, and provided in the case, a cable unit electrically connecting the camera module to the microcomputer. Here, the cable unit may include a first cable extending from the camera module to a first separation area at which the handle is separated from the door unit, a second cable extending from the first separation area to a second separation area at which the door unit is separated from the case, and a third cable extending from the second separation area to the microcomputer.

The Oven may further include a microcomputer configured to control the camera module, and a cable unit electrically connecting the camera module to the microcomputer. Here, the cable unit may be shielded with a heat-resisting material.

The camera module may be disposed lower than a top end of the transparent portion.

The camera module may include a camera configured to photograph the inside of the cooking chamber, and an illuminance sensor configured to measure an illuminance around the camera module.

In accordance with another aspect of the present disclosure, an oven includes a door unit configured to open or close a cooking chamber, at least one light source provided in the inside of the door unit, a camera configured to photograph the inside of the cooking chamber to acquire image information of the inside of the cooking chamber, an illuminance sensor configured to sense an illuminance of an area in a range of a predetermined distance from the camera, and a microcomputer configured to adjust an illuminance of the at least one light source based on the illuminance sensed by the illuminance sensor.

The microcomputer may set an illuminance of the at least one light source to a value that is higher than the illuminance sensed by the illuminance sensor.

The oven may further include a communication board configured to transmit the image information of the inside of the cooking chamber to an external device.

The communication board may receive information related to control of the oven, set by the external device, and the microcomputer may control operation of the oven, based on the information related to the control of the oven, received from the external device.

The camera may be disposed to be biased toward one end of a handle provided in an outer part of the door unit from the center in longitudinal direction of the handle.

The camera may be in a depression in an outer surface of the handle, and installed in the inside of the handle.

The illuminance sensor may be spaced a predetermined distance from the camera.

The oven may further include a storage unit configured to store illuminance information sensed by the illuminance sensor.

The storage unit may store the image information acquired by the camera.

The oven may further include a status indicator disposed in the door unit, and configured to be turned on before the camera photographs the inside of the cooking chamber and to be turned off after the camera photographs the inside of the cooking chamber.

In accordance with another aspect of the present disclosure, there is provided a method of controlling an oven, the oven including a door unit configured to open or close a cooking chamber, including receiving a control signal for photographing the inside of the cooking chamber, sensing an illuminance of an area in a range of a predetermined distance from a camera, adjusting an illuminance of at least one light source provided in the inside of the door unit, based on the sensed illuminance, photographing the inside of the cooking chamber based on the adjusted illuminance of the light source to acquire image information of the inside of the cooking chamber, and transmitting the image information of the inside of the cooking chamber to an external device.

The adjusting of the illuminance of the at least one light source may include setting an illuminance of the at least one light source to a value that is higher than the sensed illuminance.

The method of controlling the oven may further include receiving information related to control of the oven, set by the external device, and controlling operation of the oven based on the received information related to the control of the oven.

In accordance with another aspect of the present disclosure, an oven includes a case having a cooking chamber therein, a door unit connected to the case, configured to open or close the cooking chamber, and having a transparent portion configured to enable a user to see the inside of the cooking chamber, a handle protruding from the door unit to the outside, and a camera module configured to photograph the inside of the cooking chamber, and disposed to be in a depression in an outer surface of the handle.

The camera module may be disposed to be biased toward one end of the handle from the center in longitudinal direction of the handle.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
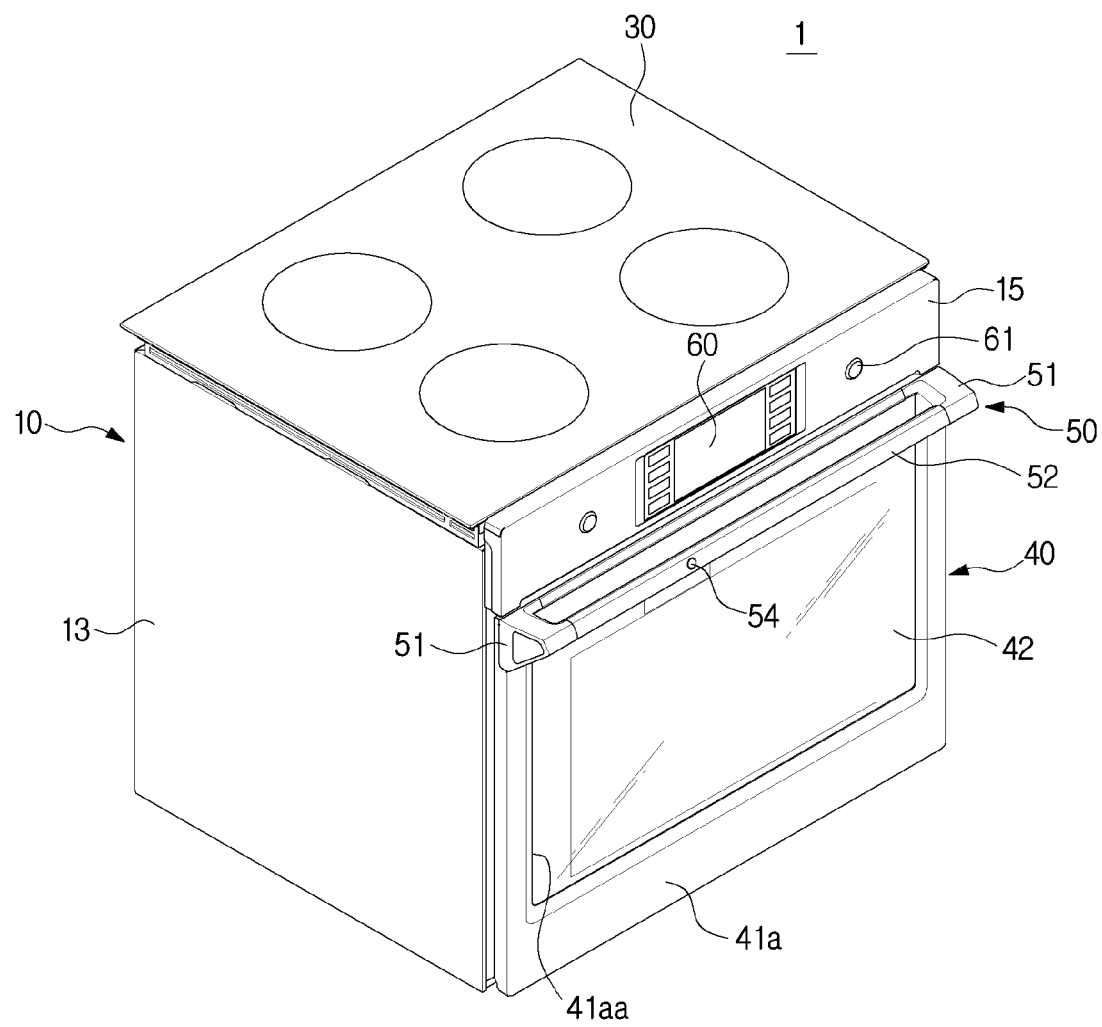
FIG. 1 is a perspective view of an oven according to an embodiment of the present disclosure.

Configurations illustrated in embodiments and the drawings described in the present specification are only exemplary embodiments, and thus it is to be understood that various modified examples, which may replace or modify exemplary embodiments described in the present specification, are possible.

Also, like reference numerals or symbols provided in the drawings of the present specification represent members or components that perform the substantially same functions.

The terms used in the present specification are used to describe exemplary embodiments of the present disclosure. Accordingly, it should be apparent to those skilled in the art that the following description of exemplary embodiments of the present disclosure is provided for illustration purpose only and not for the purpose of limiting the present disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, operations, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, embodiments of the present disclosure will be described in detail with reference to the accompanying drawings.

In the following description, the terms "front part" and "front direction" mean the front part of an oven 1 shown in FIG. 1 and a direction toward the front part of the oven, respectively, and also, the term "rear direction" means a direction toward the rear part of the oven 1.

Figure 2:
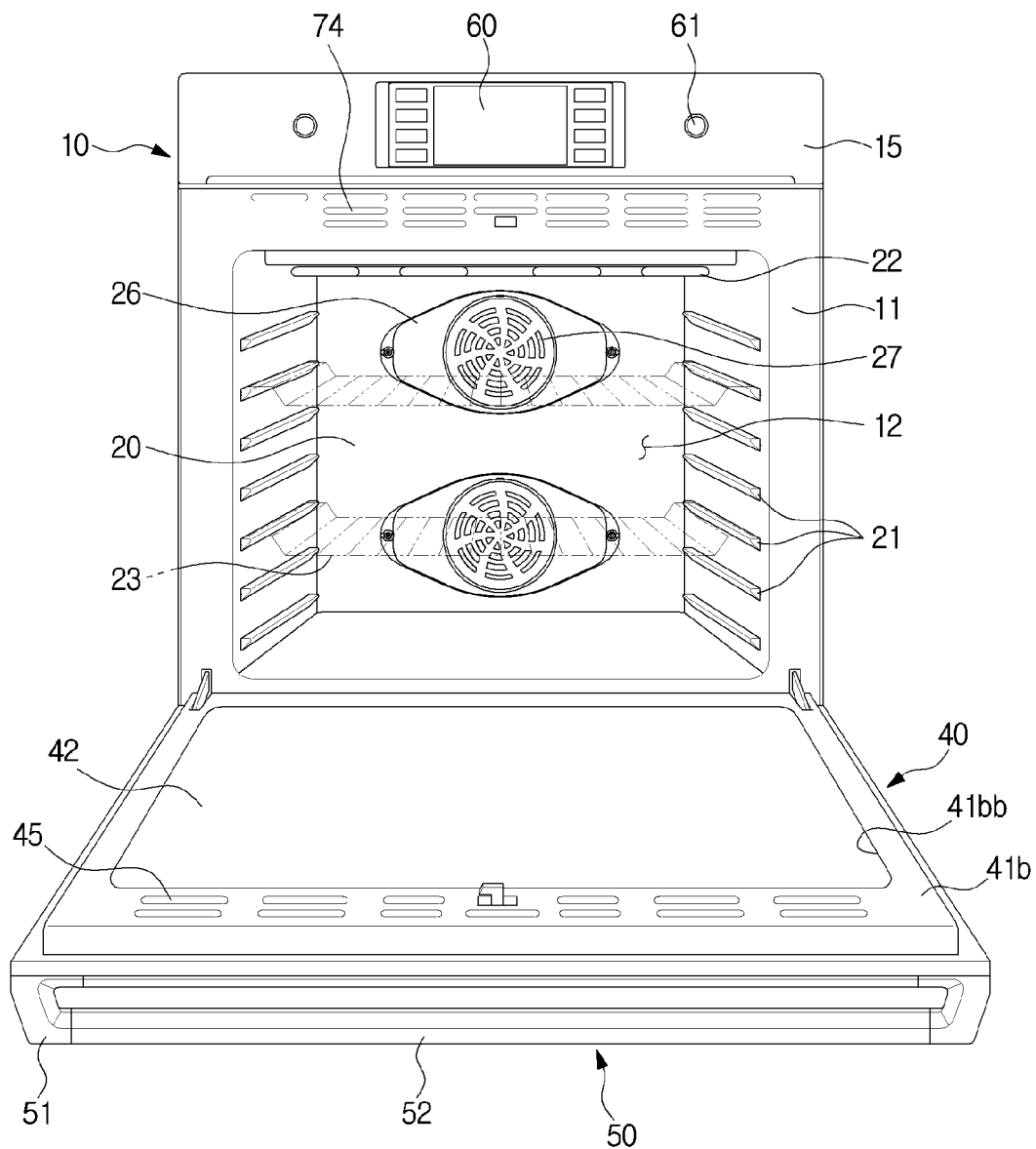
FIG. 2 shows a state in which a door of the oven according to an embodiment of the present disclosure opens.
Figure 3:
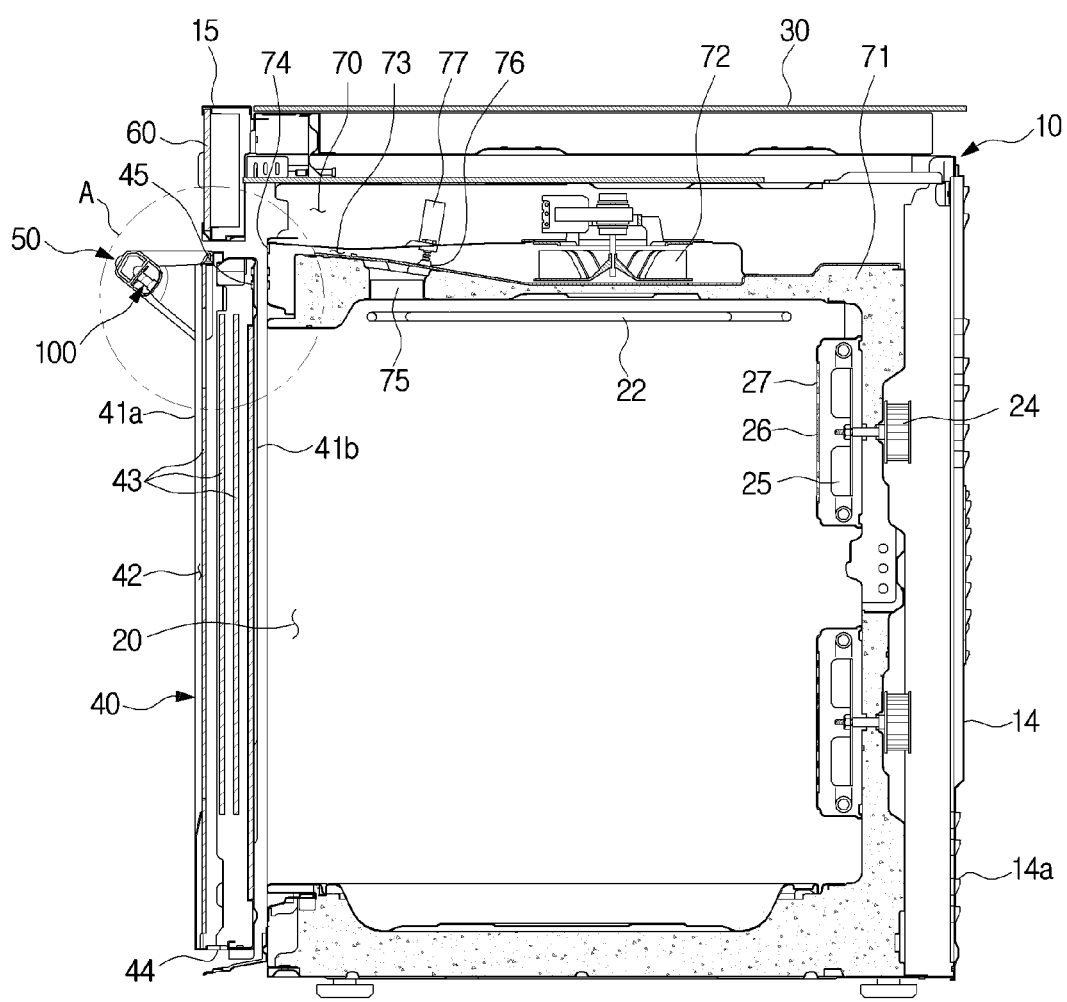
FIG. 3 is a side cross-sectional view of the oven according to an embodiment of the present disclosure.

FIG. 1 is a perspective view of an oven according to an embodiment of the present disclosure. FIG. 2 shows a state in which a door of the oven according to an embodiment of the present disclosure opens. FIG. 3 is a side cross-sectional view of the oven according to an embodiment of the present disclosure.

Referring to FIGS. 1, 2, and 3, an oven 1 (or a main body including a case and a door, hereinafter, collectively called an "oven") may include a case 10 forming an outer appearance, a cooking chamber 20 provided in the inside of the case 10, and a cooktop 30 mounted on the top of the oven 1 and configured to heat a container with a cooking material thereon.

The case 10 may include a front panel 11 forming the front part, side panels 13 forming the sides, and a rear panel 14 forming the rear part.

The cooking chamber 20 may be provided in the shape of a box in the inside of the case 10, wherein the front part of the cooking chamber 20 opens so as for a user to be able to put or take a cooking material into or out of the cooking chamber 20. In the front panel 11, an opening 12 may be provided to correspond to the open front part of the cooking chamber 20. The open front part of the cooking chamber 20 may be opened or closed by a door unit 40.

In the inside of the cooking chamber 20, a plurality of support bars 21 may be disposed. On the plurality of support bars 21, a rack 23 on which a cooking material can be put may be placed. The plurality of support bars 21 may protrude from the left and right walls of the cooking chamber 20.

A divider (not shown) for dividing the cooking chamber 20 may be removably disposed on the plurality of support bars 21. More specifically, the divider may be positioned horizontally in the cooking chamber 20 so as to divide the cooking chamber 20 into a plurality of cooking chambers 20.

The plurality of cooking chambers 20 may have different sizes. The divider may be made of an insulating material to insulate the respective cooking chambers 20. Thereby, the space of the cooking chamber 20 can be used in various ways according to a user's intention.

In the cooking chamber 20, a heater 22 may be disposed to heat a cooking material. In the current embodiment, the heater 22 may be an electric heater including an electric resistor. However, the heater 22 may be a gas heater to burn gas to generate heat. The oven 1 according to an embodiment of the present disclosure may include an electric oven and a gas oven.

In the rear part of the cooking chamber 20, a circulation fan 25 for circulating air in the cooking chamber 20 to heat a cooking material uniformly, and a circulation motor 24 for driving the circulation fan 25 may be disposed. In front of the circulation fan 25, a fan cover 26 may be disposed to cover the circulation fan 25. In the fan cover 26, an opening 27 may be formed to make air flow.

The door unit 40 may be hinge-coupled with the case 10 at the lower part in such a way to rotate with respect to the case 10. However, the door unit 40 may be hinge-coupled with the case 10 at the left or right side.

The door unit 40 may include a transparent portion 42 made of a transparent material such as glass so that a user can check the cooking process of a cooking material put in the cooking chamber 20 from the outside of the oven 1. The door unit 40 may include a front door frame 41a and a rear door frame 41b disposed along the edges of the transparent portion 42. The front door frame 41a may include a front frame opening 41aa in which the transparent portion 42 is formed, and the rear door frame 41b may include a rear frame opening 41bb in which the transparent portion 42 is formed.

In the inside of the door unit 40, a plurality of glass members 43 may be arranged. The plurality of glass members 43 may be provided to enable the user to see the inside of the cooking chamber 20 through the transparent portion 42. However, the transparent portion 42 may be made of any other transparent member, instead of the plurality of glass members 43. The plurality of glass members 43 may include a first glass member 43a, a second glass member 43b, a third glass member 43c, and a fourth glass member 43d, which are arranged in an anterior-posterior direction.

In the lower end of the door unit 40, a door inlet port 44 may be provided to inhale air into the inside of the door unit 40. Outside air flowed in from the lower end of the door unit 40 may move to the upper part of the door unit 40 to be heat exchanged with hot air transferred from the cooking chamber 20, and then discharged through a door outlet port 45 formed in the rear door frame 41b positioned in the rear part of the door unit 40. Through the configuration, the oven 1 can cool heat in the inside of the door unit 40 through the circulation of air.

At the upper end of the front part of the door unit 40, a handle 50 which the user can grip to easily open or close the door unit 40 may be provided. Meanwhile, if the door unit 40 is hinge-coupled with the case 10 at the left or right side, the handle 50 may also be disposed at the left or right side of the front part of the door unit 40 accordingly.

The handle 50 may protrude in the front direction by a predetermined length from the front part of the door unit 40. That is, the handle 50 may include a pair of handle support parts 51 extending in the front direction from the front part of the door unit 40, and a handle extension part 52 connecting the handle support parts 51 to each other. In the handle extension part 52, a camera module 100 may be installed. The camera module 100 will be described in detail, later.

Above the front part of the front panel 11, a display module 60 may be provided to display various operation information of the oven 1 and to enable the user to input operation commands. The display module 60 may be installed on a machine room cover 15.

Also, on the machine room cover 15, a manipulation unit 61 may be provided to additionally operate the oven 1.

The oven 1 may have a machine room 70 to accommodate electronic units for controlling operations of a variety of accessories including the display module 60. The machine room 70 may be positioned on the top of the cooking chamber 20. Between the machine room 70 and the cooking chamber 20, an insulating material 71 for insulating the machine room 70 from the cooking chamber 20 may be provided to prevent hot air from the cooking chamber 20 from being transferred to the machine room 70.

Also, the insulating material 71 may cover the entire outer surface of the cooking chamber 20 so as to prevent heat of the cooking chamber 20 from being transferring to the outside of the oven 1.

The oven 1 may have a cooling structure of cooling the machine room 70 by circulating air around the cooking chamber 20. The cooling structure of the oven 1 may include a cooling fan unit 72 to make air flow, and a cooling passage 73 to discharge air inhaled by the cooling fan unit 72 in the front direction from the oven 1.

That is, outside air may be inhaled into the machine room 70 through an opening 14a formed in the rear panel 14, and the air inhaled into the machine room 70 may flow in the inside of the machine room 70 to thus cool the electronic units, and then be finally discharged in the front direction from the oven 1 through a discharge opening 74 along the cooling passage 73.

A part of air in the cooking chamber 20 may be inhaled into the cooling path 73 through an outlet passage 75 and then discharged in the front direction from the oven 1. Also, a bypass hole 76 may be additionally formed to make a part of air flowing from the cooling passage 73 to the discharge opening 74 flow into the outlet passage 75. The bypass hole 76 may be opened or closed by a switch 77, and an amount of air of the cooking chamber 20 that is discharged to the outlet passage 75 may be adjusted by opening or closing the bypass hole 76.

Hereinafter, the camera module 100 for photographing the inside of the cooking chamber 20 will be described in detail.

Figure 4:
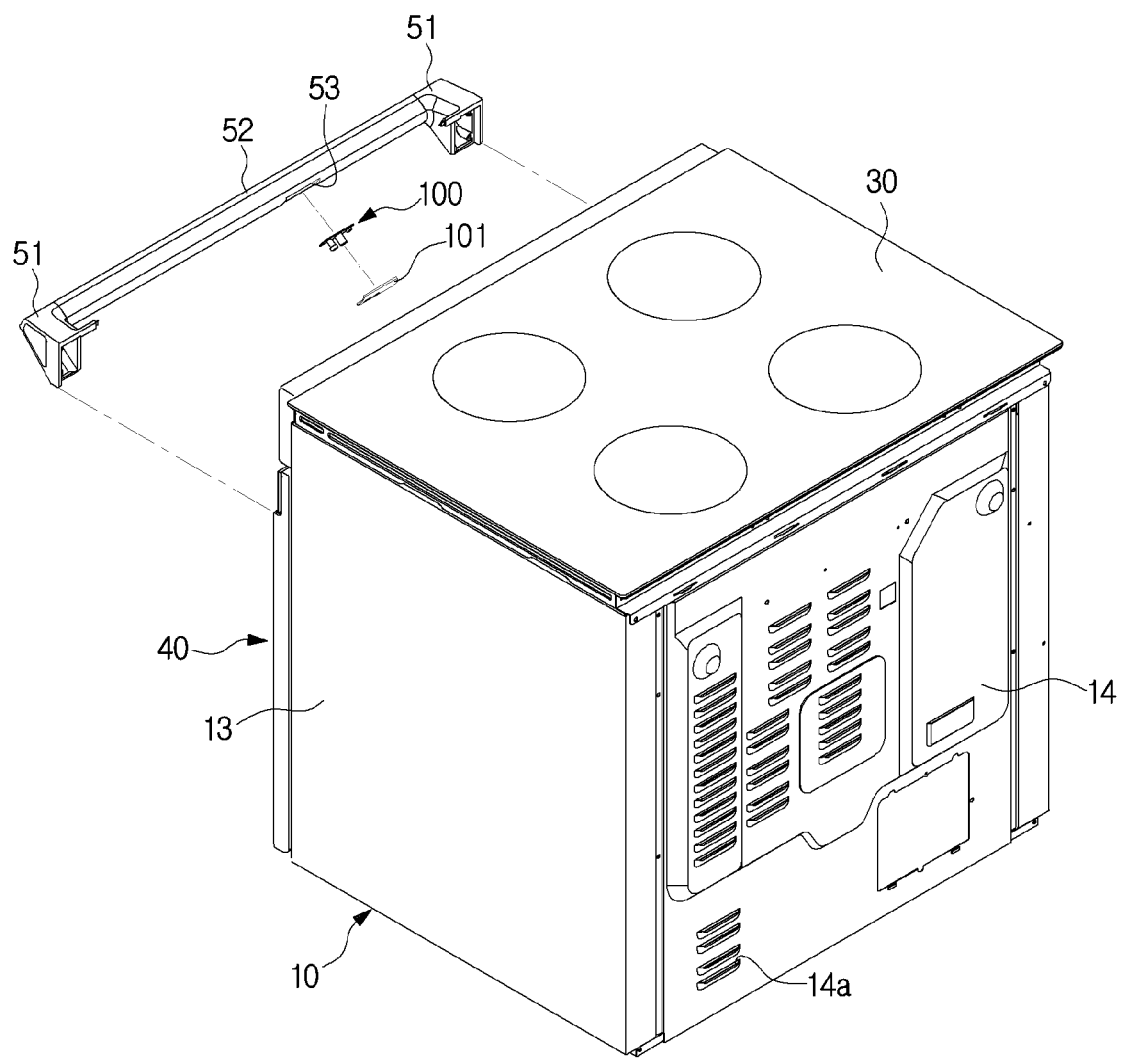
FIG. 4 is an exploded perspective view of the oven according to an embodiment of the present disclosure, wherein the handle, the camera module, and a camera cover are disassembled from the main body of the oven.
Figure 5:
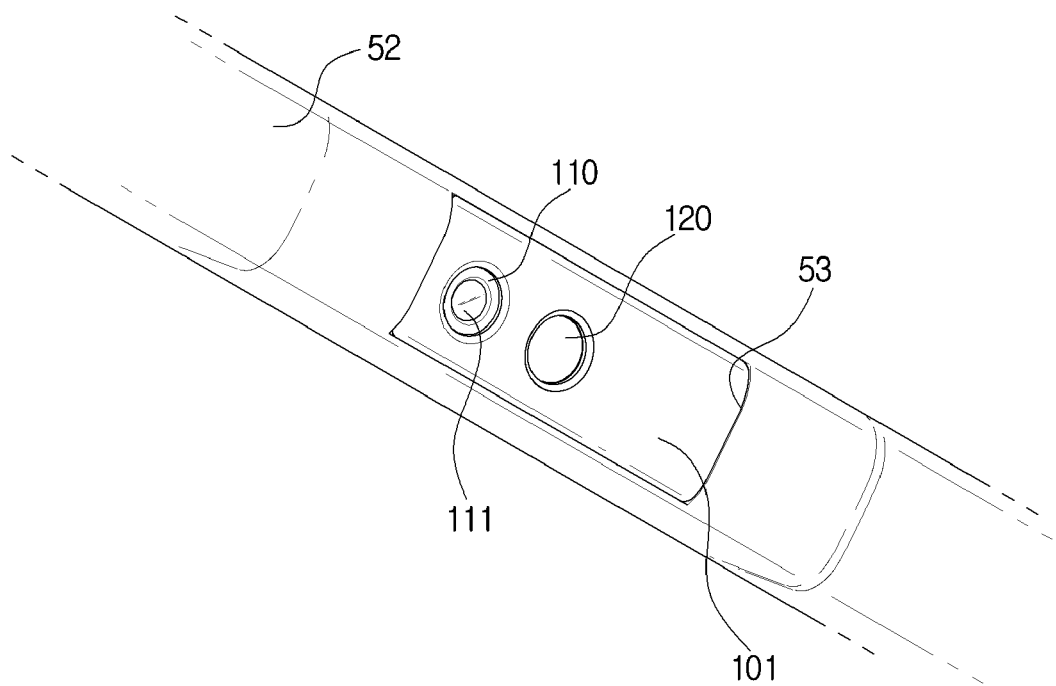
FIG. 5 is an enlarged perspective view of the camera module according to an embodiment of the present disclosure.
Figure 6:
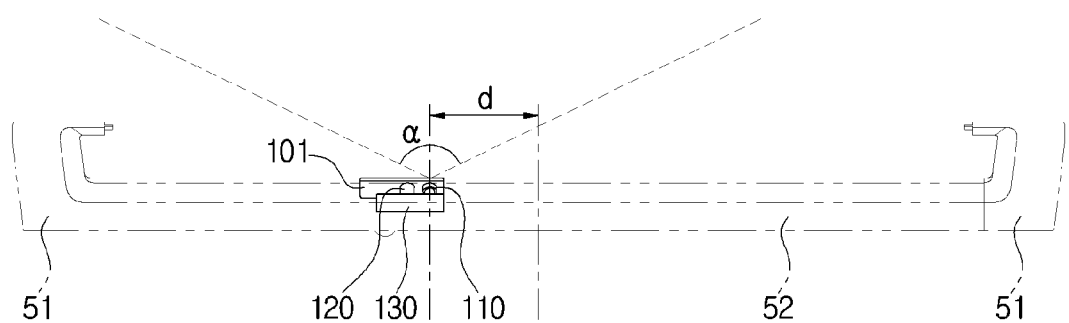
FIG. 6 shows a location of the camera module when the handle according to an embodiment of the present disclosure is seen from above.
Figure 7:
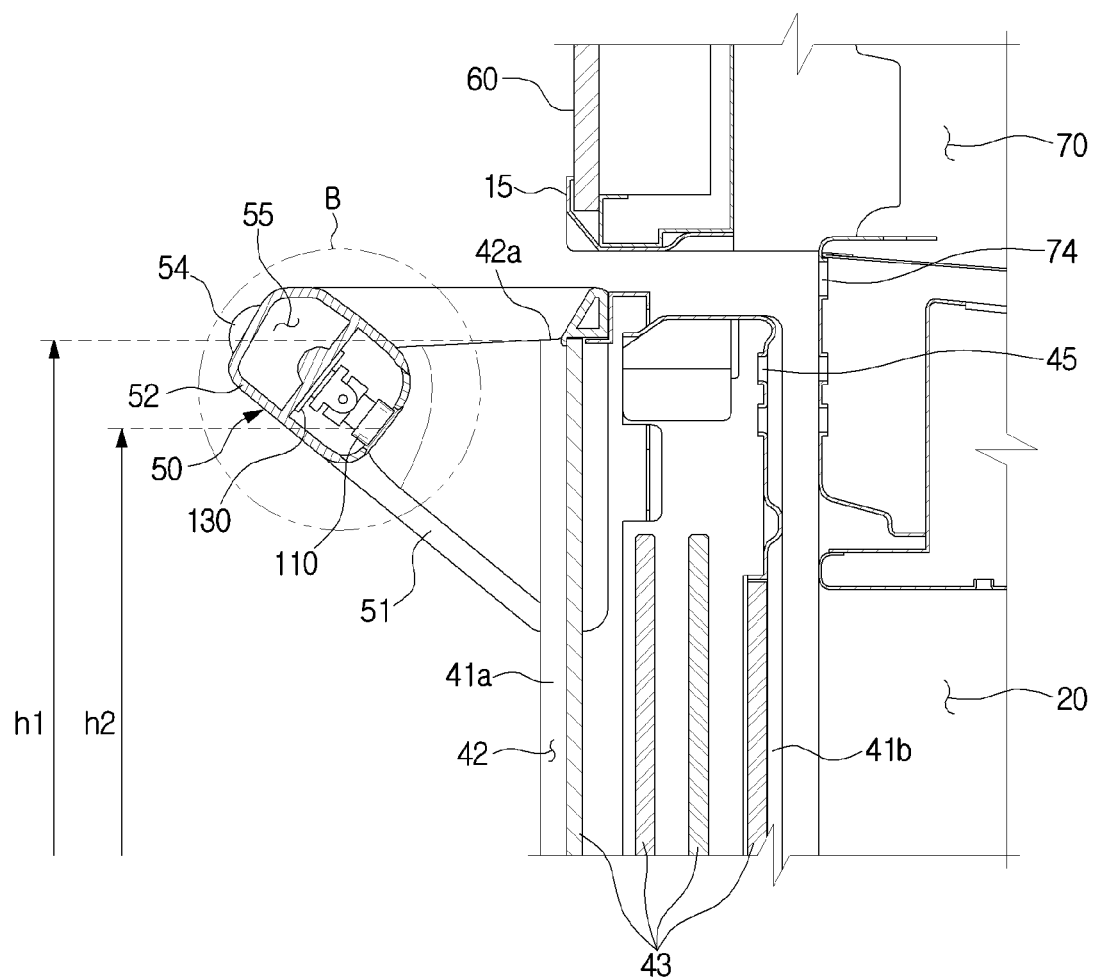
FIG. 7 is an enlarged view of an area A shown in FIG. 3.
Figure 8:
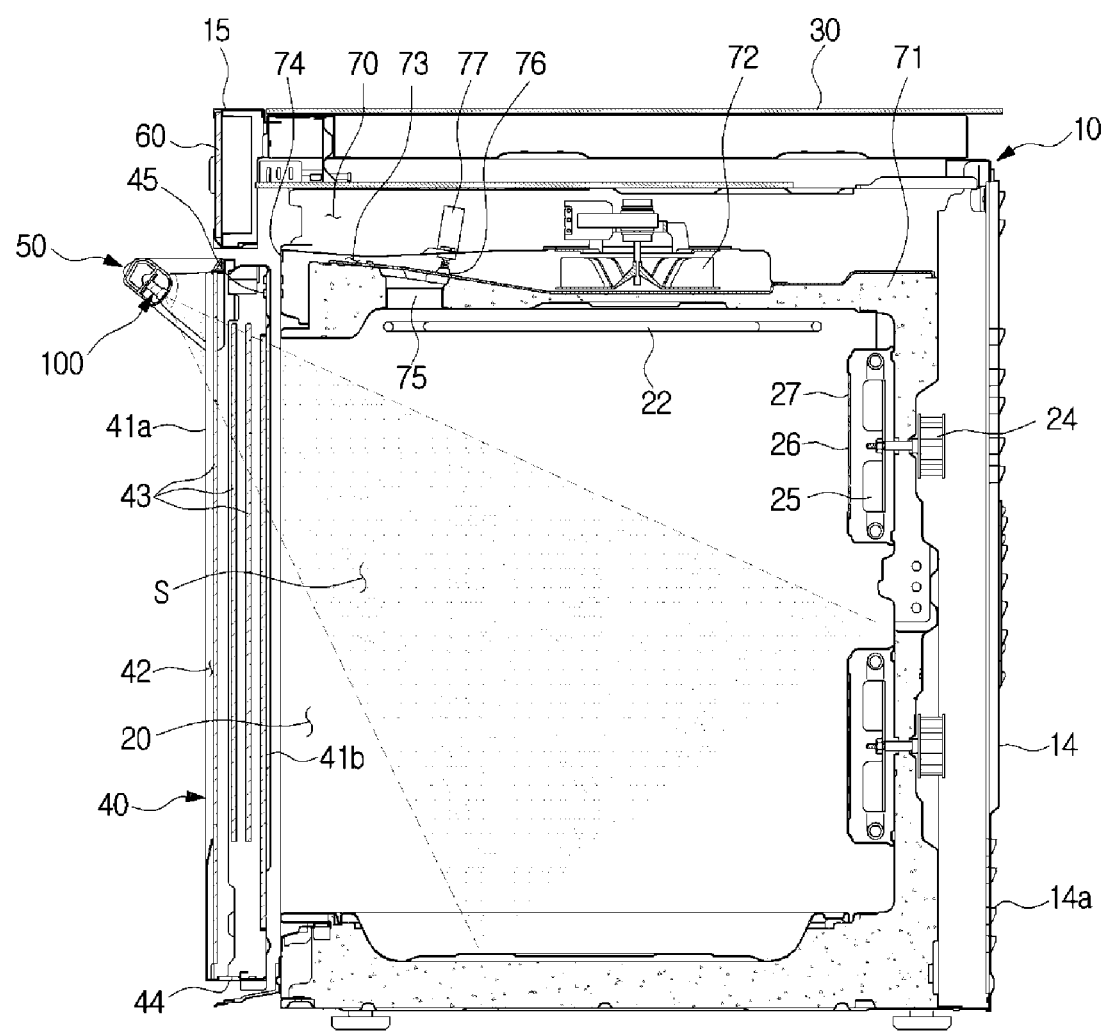
FIG. 8 is an enlarged view of an area B of FIG. 7.
Figure 9:
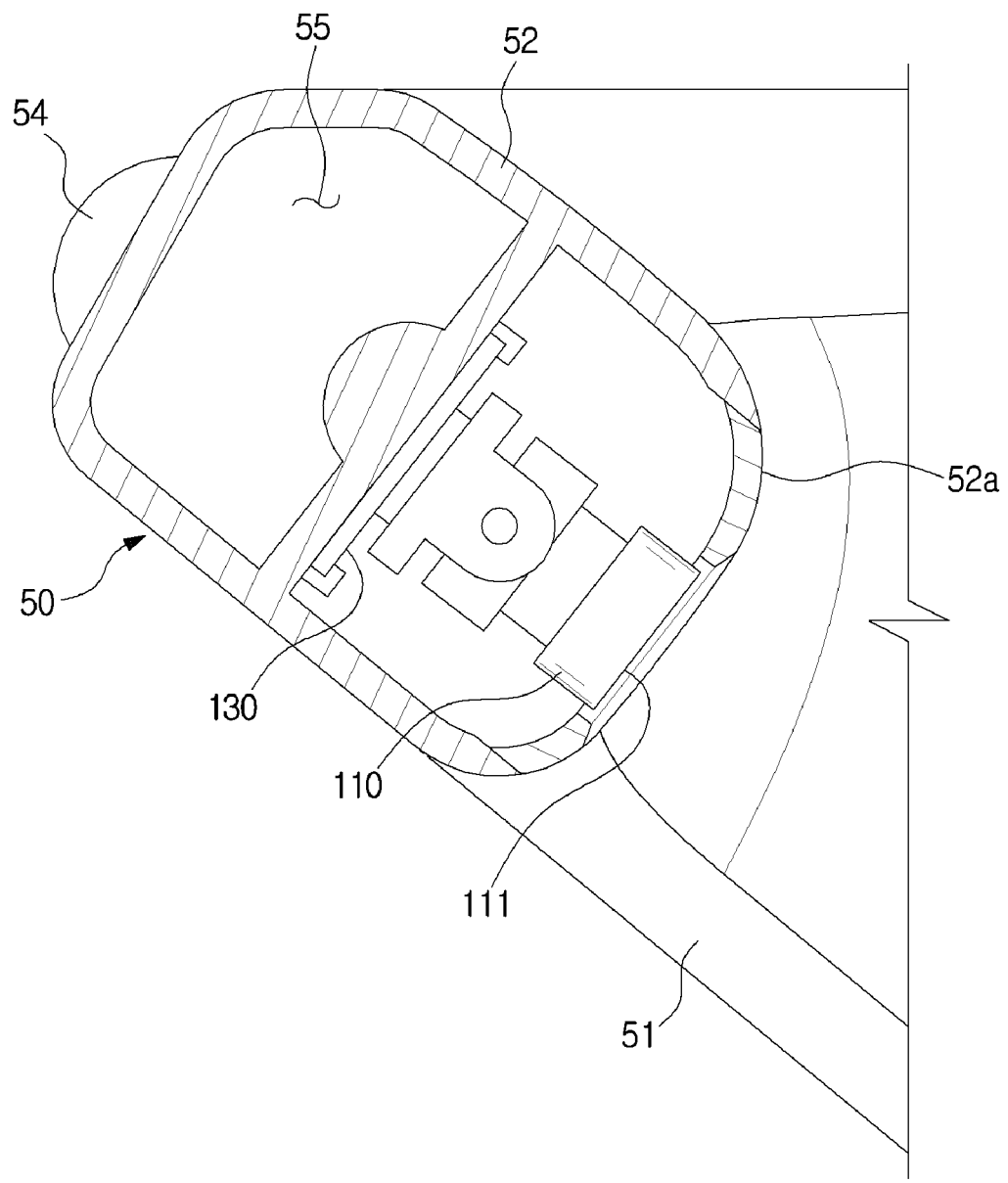
FIG. 9 briefly shows a photographing range of the camera module according to an embodiment of the present disclosure.
Figure 10:
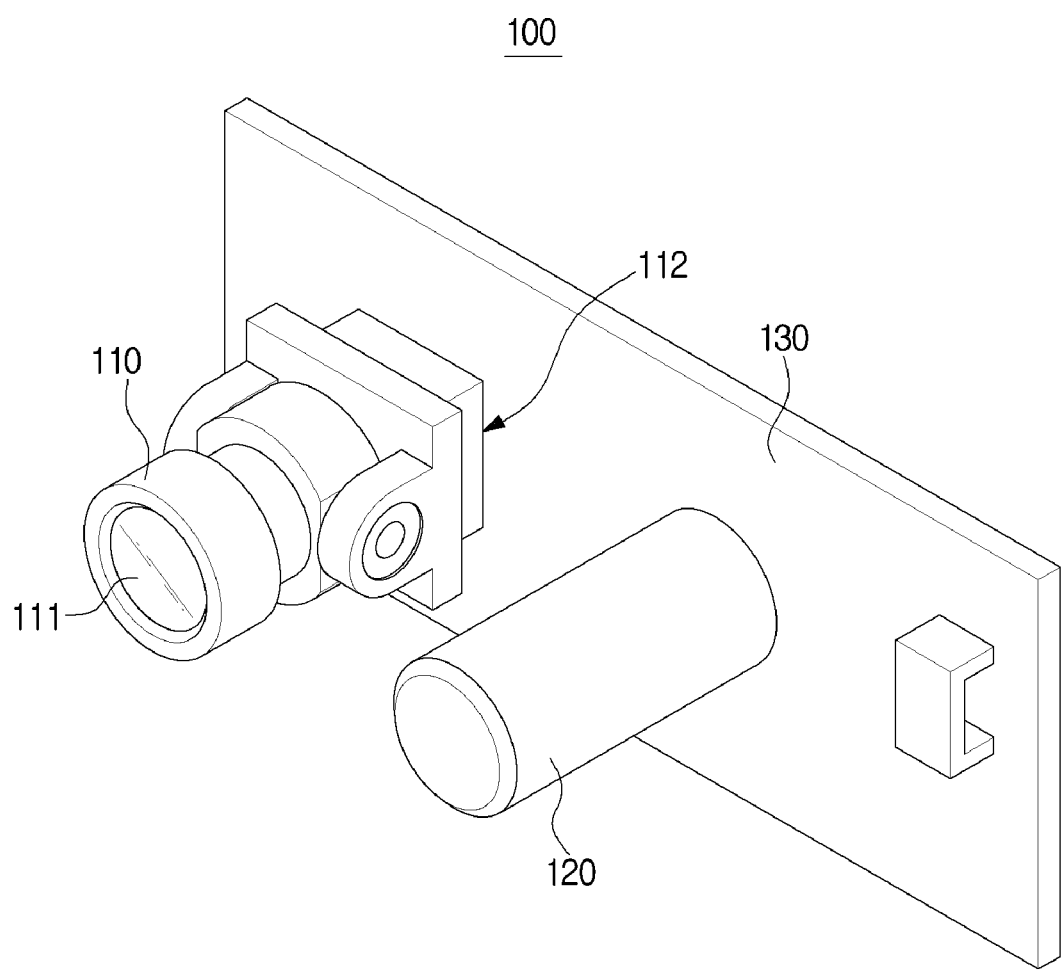
FIG. 10 is an enlarged view of the camera module shown in FIG. 3.

FIG. 4 is an exploded perspective view of the oven 1 according to an embodiment of the present disclosure, wherein the handle 50, the camera module 100, and a camera cover 101 are disassembled from the main body of the oven 1. FIG. 5 is an enlarged perspective view of the camera module 100 according to an embodiment of the present disclosure. FIG. 6 shows a location of the camera module 100 when the handle 50 according to an embodiment of the present disclosure is seen from above. FIG. 7 is an enlarged view of an area A shown in FIG. 3. FIG. 8 is an enlarged view of an area B of FIG. 7. FIG. 9 briefly shows a photographing range of the camera module 100 according to an embodiment of the present disclosure. FIG. 10 is an enlarged view of the camera module 100 shown in FIG. 3.

As shown in FIGS. 4 and 5, the camera module 100 may be installed in the inside of the handle 50 toward the cooking chamber 20. More specifically, the camera module 100 may be installed in the inside of the handle extension part 52 through a handle opening 53 formed in the handle extension part 52, and may be protected from the outside environment by the camera cover 101. The camera module 100 may be disposed to photograph the inside of the cooking chamber 20 through the transparent portion 42. The camera module 100 may include a camera 110 to photograph the inside of the cooking chamber 20.

The camera 110 may observe the inside of the cooking chamber 20 through the transparent portion 42. Preferably, the camera 110 may have photographing angles of about 60 degrees in a vertical direction and about 100 degrees in a horizontal direction.

As described above, since the transparent portion 42 is made of a transparent material, and the plurality of glass members 43 are arranged to correspond to the transparent portion 42 in the inside of the door unit 40, the camera module 100 can photograph the inside of the cooking chamber 20, although the camera module 100 is located at the outside of the transparent portion 42, neither at the inside of the cooking chamber 20 nor at the inside of the door unit 40.

Also, since the cooking chamber 20 is maintained at temperature of about 200 degrees during cooking, the camera unit 100 may be damaged by heat if it is located adjacent to the cooking chamber 20.

In order to prevent the camera module 100 from being damaged by heat, the camera module 100 may be disposed at the handle 50 so as to be spaced from the cooking chamber 20. Since the camera module 100 is spaced from the cooking chamber 20, the camera module 100 may be less damaged by heat generated from the cooking chamber 20. Accordingly, it is possible to ensure the product reliability of the camera module 100.

As shown in FIG. 6, the camera module 100 may be disposed in such a manner to be biased by a predetermined distance d from the center in longitudinal direction of the handle extension part 52 toward one end of the handle extension part 52. More specifically, the camera module 100 may be biased by about 80 mm from the center in longitudinal direction of the handle extension part 52 toward one end of the handle extension part 52. A distance by which the camera module 100 is biased from the center in longitudinal direction of the handle extension part 52 may be decided in consideration of a photographing angle α of the camera 110 of the camera module 100. More specifically, the camera module 100 may be biased from the center of the handle extension part 52 in a range in which the camera 110 can photograph the entire inside of the cooking chamber 20.

Since the camera module 100 is biased from the center in longitudinal direction of the handle extension part 52, the camera module 100 may be prevented from contamination (dirtied) by a user's hand gripping the handle 50.

More specifically, the user may grip the handle 50 with his/her hand covered with food during cooking. Generally, when the user grips the handle 50 to open or close the door unit 40, the user may grip the center area of the handle 50 to open or close the door unit 40. If the camera module 100 is positioned at or around the center area of the handle extension part 52, the lens 111 of the camera module 100 may become contaminated (dirty) by food on the user's hand, the user's fingerprint, etc.

However, since the camera module 100 according to an embodiment of the present disclosure is biased by a predetermined distance from the center area of the handle 50 toward one end of the handle 50, the camera module 100 may be prevented from becoming contaminated (dirty) by the user's hand gripping the handle 50.

Also, the camera module 100 may be positioned at a location at which it can photograph the entire inside of the cooking chamber 20, in consideration of a maximum photographing angle (that is, a maximum angle of view) of the camera 110.

More specifically, as shown in FIGS. 7 and 8, the camera module 100 may be disposed in the inside of the handle 50, and inclined downward toward the inside of the cooking chamber 20. Also, since the camera module 100 is based from the center area of the handle 50 toward one end of the handle 50, the lens 111 of the camera 110 may be inclined by a predetermined angle in the left and right direction so as to face the center of the cooking chamber 20.

Also, a height h2 of the center of the lens 111 of the camera 110 included in the camera module 100 may be the same as a height h1 of the top end 42a of the transparent portion 42, or lower than the height h1 of the top end 42a of the transparent portion 42, so that the upper part of the photographing area of the camera 110 can be prevented from being interfered by the upper end 42a of the transparent portion 42. Accordingly, the camera module 100 may have a photographing area S as shown in FIG. 8.

Also, the camera module 100 according to the present disclosure may be embedded in the inside of the handle 50. More specifically, the lens 111 of the camera 110 may be in a depression toward the inner side of the handle 50 than the outer surface 52a of the handle extension part 52. According to the configuration, since the user's hand can be prevented from contacting the lens 111 of the camera 110 even when the user grips the handle 50 at the location of the handle 50 at which the camera module 100 is disposed, the lens 111 can be prevented from becoming contaminated (dirty) by food on the user's hand or the user's fingerprint.

Also, the handle 50 according to the present disclosure may include a status indicator 54 disposed in the other side (that is, the front part of the handle 50) of the handle 50 that is opposite to one side of the handle 50 in which the camera 110 of the camera module 110 is disposed so that the user can easily recognize whether the camera 110 operates.

The status indicator 54 may include a light source that informs the user that the camera 110 is photographing, through a method of continuously or repeatedly emitting light while the camera 110 is photographing. However, the status indicator 54 may inform the user that the camera 110 is photographing, through sound. More specifically, the status indicator 54 may inform the user that the camera 110 is photographing, through continuous sound (for example, music) or repeated sound.

Also, the handle 50 according to the present disclosure may include an internal space 55 which is formed in the longitudinal direction of the handle 50 in the inside of the handle extension part 52 and in which a cable unit 200 to be described later is disposed. The cable unit 200 may extend to one end of the handle 50 from the camera module 100 through the internal space 55 of the handle 50. The cable unit 200 will be described later.

Referring to FIG. 10, the camera module 100 may include an illuminance sensor 120 to measure external lighting, the camera 110, and a camera board 130 configured to control the illuminance sensor 120 and to transmit/receive information to/from an external device.

The illuminance sensor 120 may measure brightness around the oven 1, and transmit a measured value about the brightness to a microcomputer 80 which will be described later. The illuminance sensor 120 will be described later.

The camera 110 and the illuminance sensor 120 may be mounted on the camera board 130, and may include a communication board 135 (see FIG. 18) to transmit/receive information to/from an external device, and a connector to which the cable unit 200 for electrically connecting to the microcomputer 80 which will be described later is connected.

The communication board 135 may transmit image information or video information about the inside of the cooking chamber 20 photographed by the camera 110 to the external device. The communication board 135 may transmit information to the external device and receive information from the external device, through various communication methods.

For example, the communication board 135 may transmit/receive radio signals through a communication method, such as 3Generation (3G) communication and 4Generation (4G) communication, and transmit/receive information within a predetermined range through a communication method, such as Wireless LAN, Wireless-Fidelity (Wi-Fi), Bluetooth, Zigbee, Wi-Fi Direct (WFD), Ultra WireBand (UWB), Infrared Data Association (IrDA), Bluetooth Low Energy (BLE), and Near Field Communication (NFC).

The handle 50 may include a part made of a material including plastic resin in order to prevent communication restriction of the communication board 135.

Information transmission/reception of the communication board 135 will be described in detail, later.

Also, the camera 110 may be rotated by a rotation member 112.

The rotation member 112 may be positioned between the camera 110 and the camera board 130, and configured to rotate the camera 110 by rotation of the rotation member 112. The rotation member 112 may have a hinge structure to tilt the camera 110 in the up and down direction or in the left and right direction. Alternatively, the rotation member 112 may have a ball structure to rotate the camera 110 freely.

Since the camera 110 can rotate, a photographing range of the camera 110 can be widened, and since the camera 110 can rotate to the height of the rack 23 on which food is placed to photograph the food, clear image information meeting the user's requirements can be acquired.

Also, the camera module 100 can move in the longitudinal direction of the handle 50 to photograph the cooking chamber 20 at various angles, which is not shown in the drawings.

Figure 11:
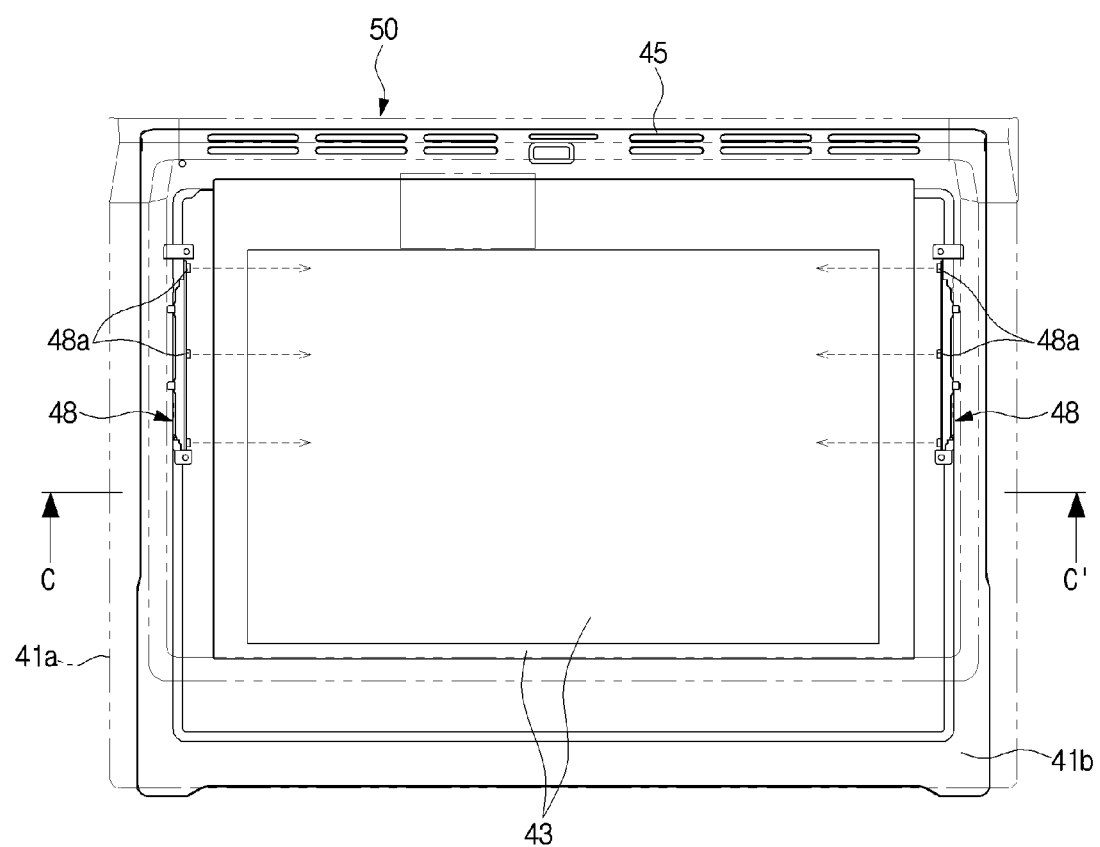
FIG. 11 transparently shows the front door frame of the door unit according to an embodiment of the present disclosure, and the first glass member of the plurality of glass members.
Figure 12:
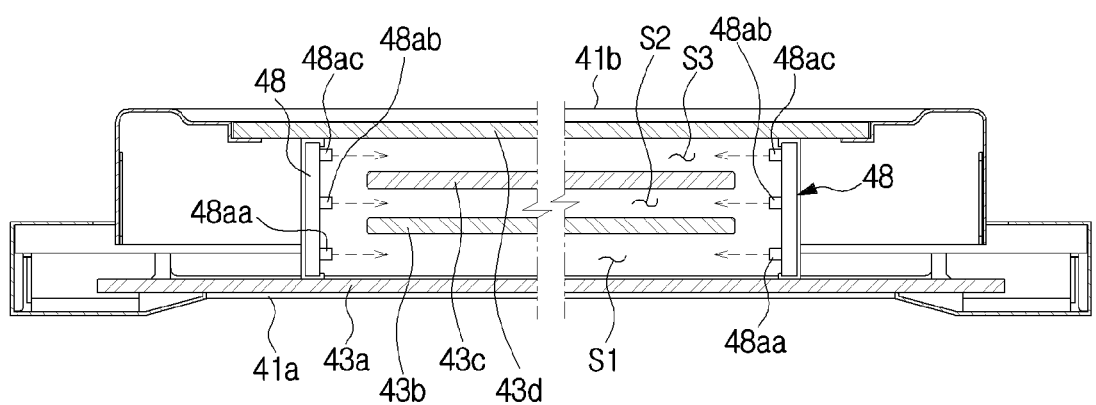
FIG. 12 is a cross-sectional view of the door unit, cut along a line C-C' of FIG. 11.

FIG. 11 transparently shows the front door frame 41a of the door unit 40 according to an embodiment of the present disclosure, and the first glass member 43a of the plurality of glass members 43, and FIG. 12 is a cross-sectional view of the door unit 40, cut along a line C-C' of FIG. 11.

Referring to FIGS. 11 and 12, the door unit 40 according to an embodiment of the present disclosure may include a light source unit 48 therein. The light source unit 48 may selectively emit light in the inside of the door unit 40 by the microcomputer 80 which will be described later. The light source unit 48 may include a plurality of light sources 48a. The plurality of light sources 48a may illuminate individually. Since the plurality of light sources 48a illuminate individually by the microcomputer 80, the user can adjust the brightness of the inside of the door unit 40.

The light source unit 48 may be, as shown in FIG. 11, positioned to the left and/or right of the inside of the door unit 40. That is, the light source unit 48 may be positioned to the left and/or right of the door unit 40, and the respective light sources 48*a* may be disposed in spaces between the plurality of glass members 43. According to the configuration, the respective light sources 48*a* may provide light to the spaces between the plurality of glass members 43.

More specifically, the plurality of light sources 48*a* may include a first light source 48*aa*, a second light source 48*ab*, and a third light source 48*ac*. The first light source 48*aa* may provide light to a first space S1 between the first glass member 43*a* and the second glass member 43*b*, the second light source 48*ab* may provide light to a second space S2 between the second glass member 43*b* and the third glass member 43*c*, and the third light source 48*ac* may provide light to a third space S3 between the third glass member 43*c* and the fourth glass member 43*d*. The first light source 48*aa*, the second light source 48*ab*, and the third light source 48*ac* may be arranged in a up and down direction, in an anterior-posterior direction, or in an oblique direction. Also, the first light source 48*aa*, the second light source 48*ab*, and the third light source 48*ac* may be individually controlled so as to adjust an amount of light that is provided to the inside of the door unit 40.

However, the light source unit 48 may have any other arrangement as long as it is disposed in the upper and/or lower part of the door unit 40 to provide light to the spaces between the plurality of glass members 43. That is, the light source unit 48 may be disposed at any position at which it can provide light to the inside space of the door unit 40.

According to the configuration, since the inside of the door unit 40 is illuminated by the light source unit 48, the camera 110 can more clearly photograph the inside of the cooking chamber 20. Also, since the brightness of the inside of the door unit 40 can be adjusted in consideration of information about the external brightness of the oven 1 measured through the luminance sensor 120, it is possible to prevent the light source unit 48 from emitting light unnecessarily. That is, since a large amount of light is not needed when the outside of the oven 1 is dark, the light source unit 48 may be controlled to provide a necessary amount of light. Accordingly, it is possible to prevent energy from being unnecessarily consumed.

Figure 13:
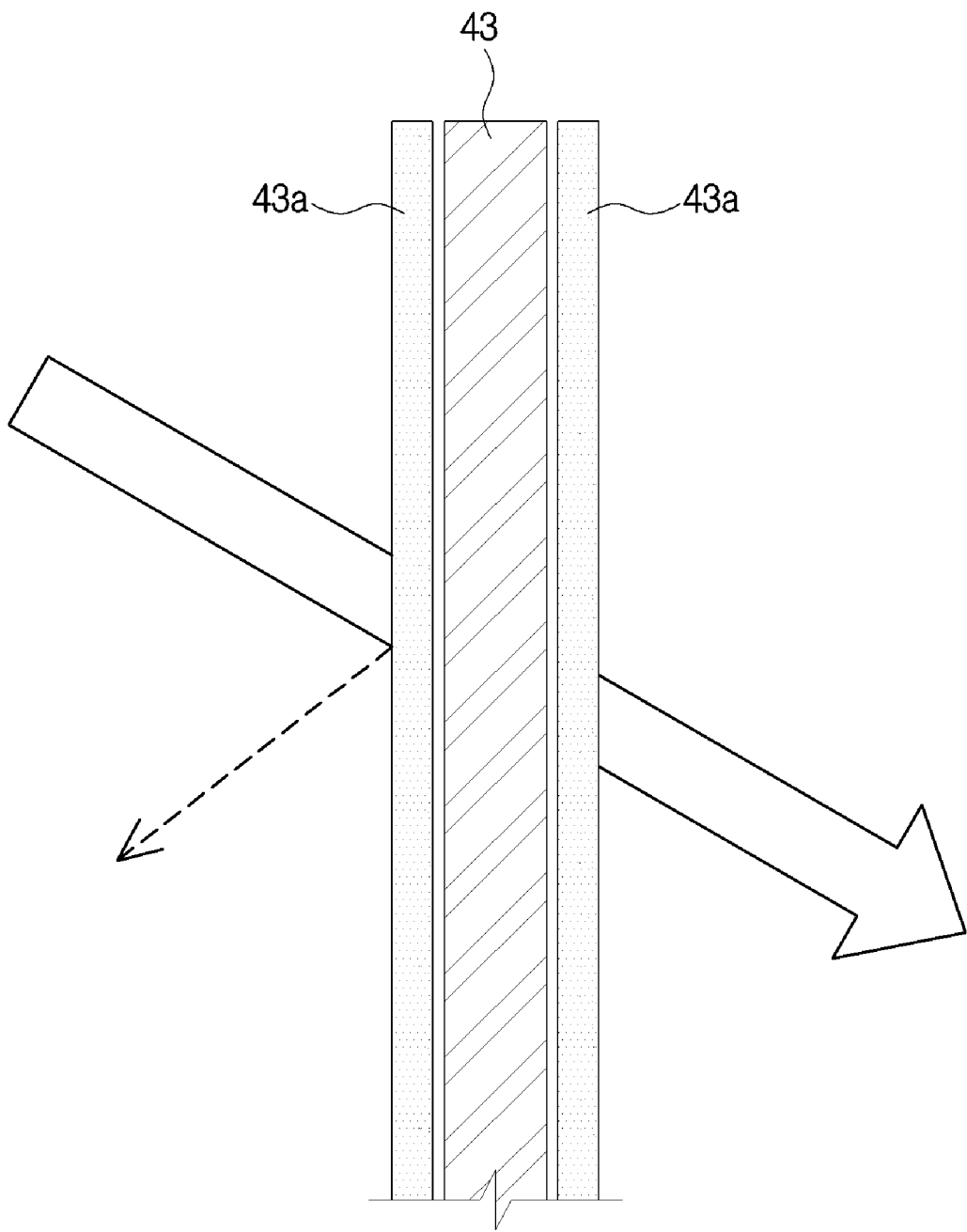
FIG. 13 briefly shows one of the plurality of glass members shown in FIG. 3, on which an anti-reflection coating layer is formed.
Figure 14:
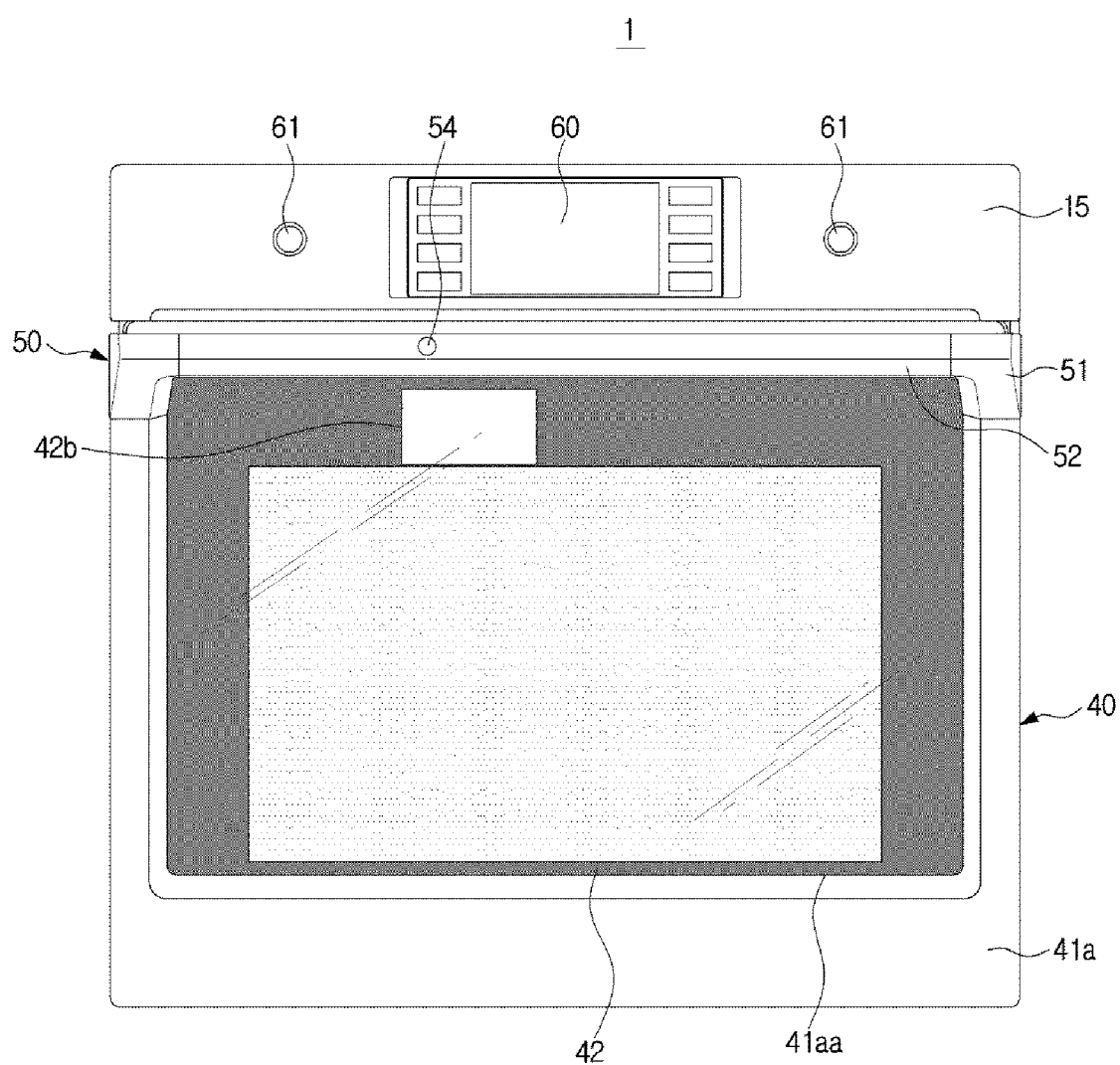
FIG. 14 shows a front part of an oven according to another embodiment of the present disclosure.

FIG. 13 briefly shows one of the plurality of glass members 43 shown in FIG. 3, on which an anti-reflection coating layer is formed. FIG. 14 shows a front part of an oven according to another embodiment of the present disclosure.

Referring to FIG. 13, at least one glass member 43 of the plurality of glass members 43 may include an anti-reflection coating layer 43*a* configured to prevent reflection of light to increase the transmittance of light. The anti-reflection coating layer 43*a* may be formed by a method of forming a thin film of a derivative having an appropriate refractive index on the surface of an optical device through deposition or the like, although the anti-reflection coating layer 43*a* can be formed by any other method. The anti-reflection coating layer 43*a* may be formed on both surfaces of the glass member 43, as shown in FIG. 13, or on one surface of the glass member 43.

As such, by forming the anti-reflection coating layer 43*a* to reduce the light reflectivity of at least one glass member 43 of the plurality of glass members 43 installed in the inside of the door unit 40 and to improve the light transmittance of the glass member 43, the camera 110 can more clearly photograph the inside of the cooking chamber 20. That is, by improving the light transmittance of at least one glass member 43 so as to increase an amount of light that is provided to the inside of the cooking chamber 20 through the transparent portion 42, the camera 110 can acquire a more clear image.

Unlike this, a mirror glass coating layer may be formed on the transparent portion 42. More specifically, as shown in FIG. 14, a mirror glass coating layer may be formed on the entire area of at least one glass member 43 of the plurality of glass members 43 so as to reflect all of light provided toward the cooking chamber 20 from the outside. Accordingly, the cooking chamber 20 is shown as if it is a mirror, as seen from the outside of the oven 1, when the light sources 48*a* installed in the inside of the cooking chamber 20 emit no light to the inside of the cooking chamber 20, so that the user cannot see the inside of the cooking chamber 20. However, when the light sources 48*a* installed in the inside of the cooking chamber 20 emit light to the inside of the cooking chamber 20, the user can see the inside of the cooking chamber 20 from the outside of the oven 1. According to the configuration, the camera 110 may acquire a more clear image of the cooking chamber 20 when the light sources 48*a* installed in the inside of the cooking chamber 20 emit light to the inside of the cooking chamber 20.

As shown in FIG. 14, in an area of the transparent portion 42, a masking portion 42*b* subject to a masking process so that the mirror glass coating layer is not formed thereon may be provided. More specifically, an area corresponding to the photographing area of the camera 110 may be formed as a masking portion 42*b* on which the mirror glass coating layer is not formed. Accordingly, the transparent portion 42 may reflect light provided from the outside at its major area except for the masking portion 42*b*, but, at the masking portion 42*b*, the transparent portion 42 may enable the camera 110 to have no interference when photographing the inside of the cooking chamber 20 to thus acquire a more clear image.

Also, the plurality of glass members 43 may be made of glass such as quartz having low reflectivity to improve light transmittance so that a clear image of the cooking chamber 20 can be acquired, which is not shown in the drawings.

Figure 15:
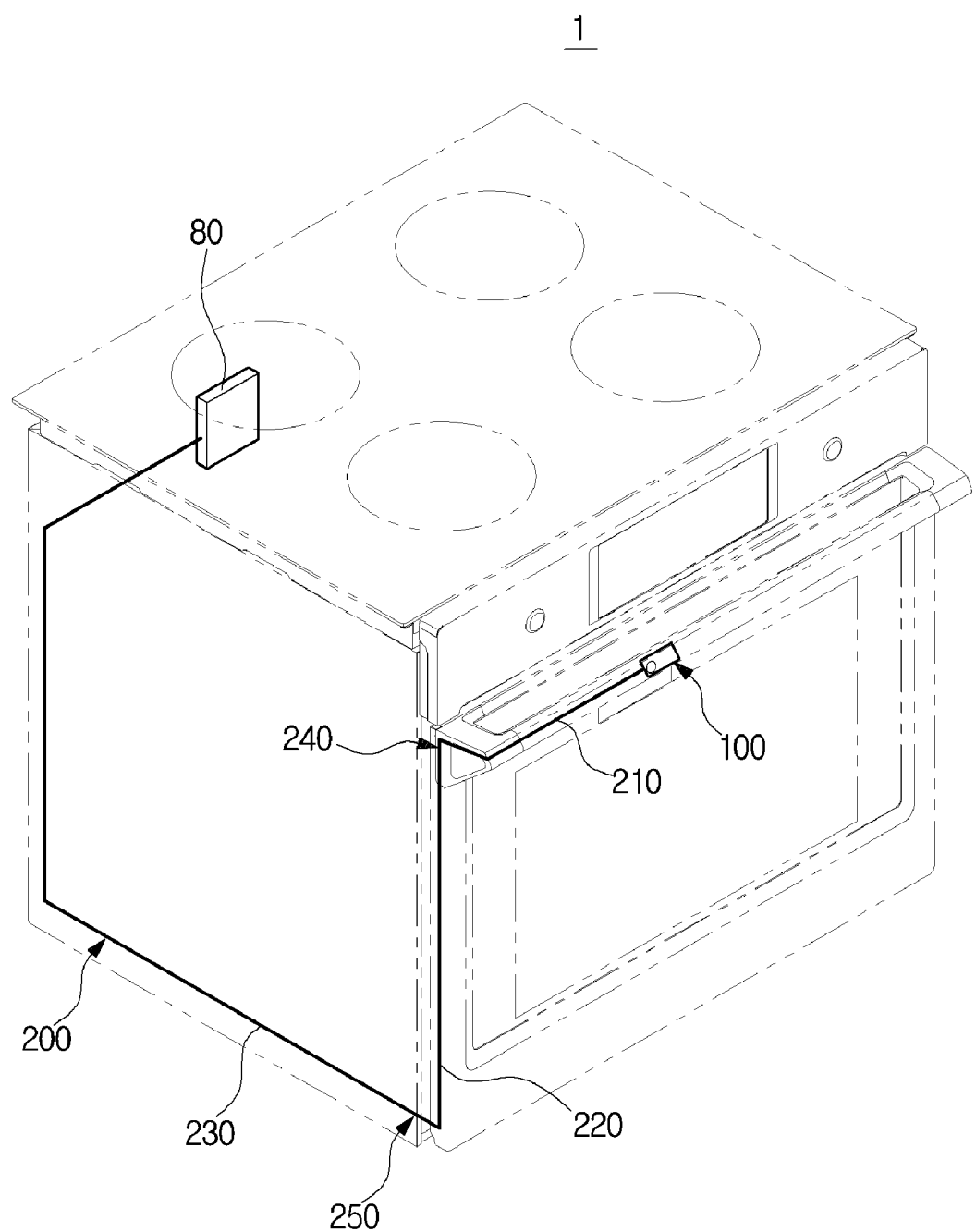
FIG. 15 shows the wiring of the cable unit according to an embodiment of the present disclosure.
Figure 16:
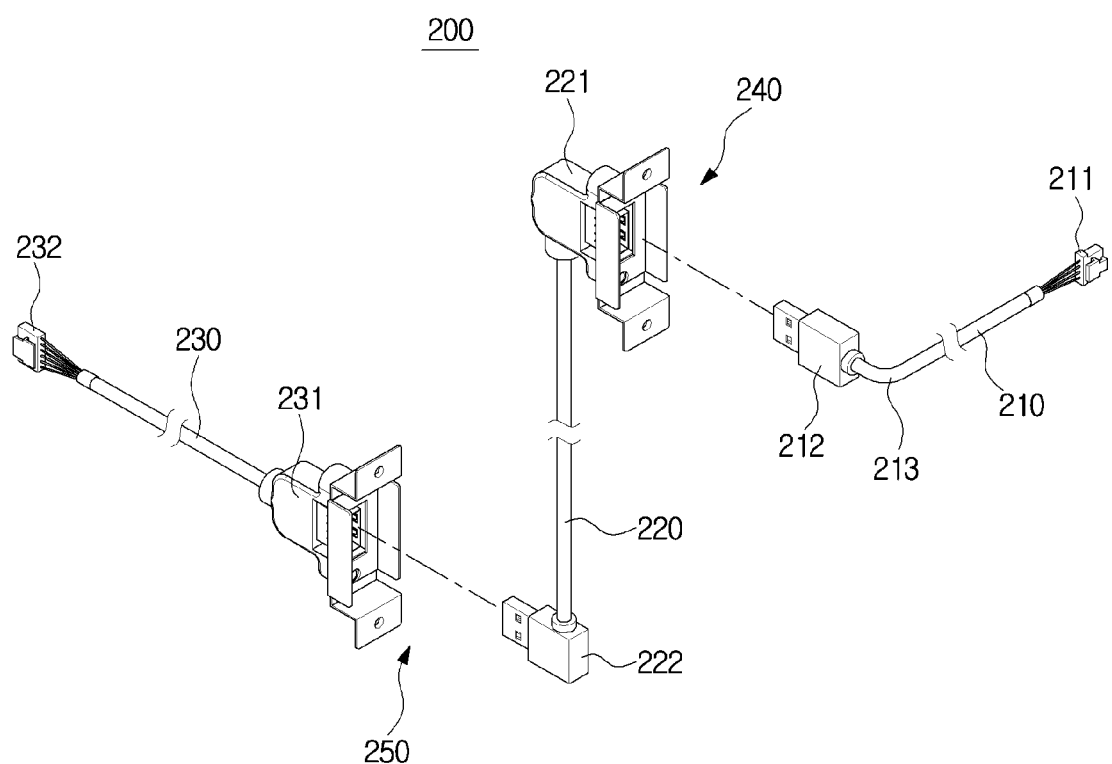
FIG. 16 is a perspective view of the cable unit according to an embodiment of the present disclosure.
Figure 17:
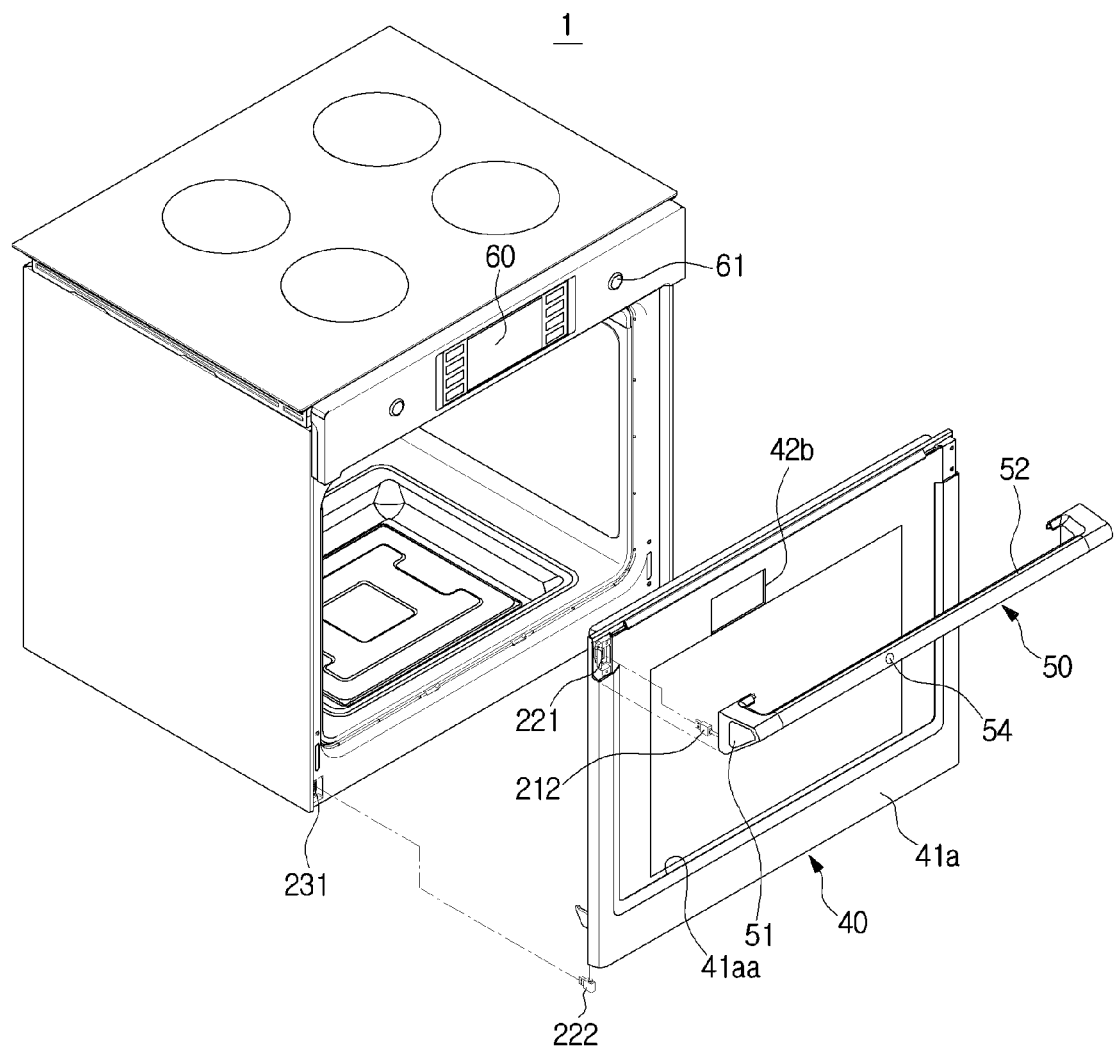
FIG. 17 is an exploded perspective view of the oven, wherein the case, the door unit, and the handle are disassembled from the main body of the oven.

FIG. 15 shows the wiring of the cable unit 200 according to an embodiment of the present disclosure. FIG. 16 is a perspective view of the cable unit 200 according to an embodiment of the present disclosure. FIG. 17 is an exploded perspective view of the oven 1, wherein the case 10, the door unit 40, and the handle 50 are disassembled from the main body of the oven 1.

Hereinafter, the cable unit 200 configured to electrically connect the camera module 100 to the microcomputer 80 will be described in detail.

The oven 1 may include the microcomputer 80 to control the camera module 100.

The microcomputer 80 may be a configuration of controlling the camera module 100 independently, or a configuration of controlling the camera module 100 additionally while controlling overall operations of the oven 1. More specifically, the microcomputer 80 may control the camera 110 of the camera module 100 and the illuminance sensor 120. In the following description, the microcomputer 80 is assumed to be a configuration of controlling the camera module 100 and the oven 1.

Also, the microcomputer 80 is assumed to be a configuration including a microcomputer in the form of a chip, a board on which the microcomputer is mounted, and various kinds of electronic devices mounted on the board and configured to operate the microcomputer.

The cable unit 200 may be connected between the microcomputer 80 and the camera module 100. The cable unit 200 may electrically connect the microcomputer 80 to the camera module 100.

The cable unit 200 may perform a function of supplying power to the camera module 100 and transmitting/receiving information between the microcomputer 80 and the camera unit 100.

The microcomputer 80 may be installed in the inside of the rear panel 14 of the oven 1. Accordingly, the cable unit 200 may pass through the inside of the rear panel 14 and the inside of the side panel 13.

More specifically, as shown in FIG. 15, the cable unit 200 connected to the microcomputer 80 may extend to the left from the inside of the rear panel 14, then be bent downward, again bent in the front direction of the oven 1 at a height corresponding to a part of the case 10 to which the door unit 40 is connected, and then extend to face the front panel 11.

The cable unit 200 extending from the microcomputer 80 to the front panel 11 may be fixed by a plurality of fixing members through which the cable unit 200 can be fixed at and supported by an arbitrary configuration installed in the case 10.

The cable unit 200 installed in the inside of the side panel 13 may penetrate the front panel 11 to extend to the inside of the door unit 40, and then be connected to the camera module 100. The wiring of the cable unit 200 is aimed to easily decouple the cable unit 200 when the door unit 40 is decoupled from the main body of the oven 1.

Also, the cable unit 200 installed in the inside of the door unit 40 may penetrate the door unit 40 at a height corresponding to a first separation area 240 at which the handle 50 is connected to the door unit 40 to extend to the inside of the handle 50 and be connected to the camera module 100. The wiring of the cable unit 200 is aimed to easily decouple the cable unit 200 when the handle 50 is decoupled from the door unit 40.

The cable unit 200 extending in the front direction from the oven 1 along the handle support part 51 of the handle 50 may be bent in the longitudinal direction of the handle extension part 52 at a part at which the handle support part 51 is connected to the handle extension part 52.

Since the cable unit 200 is positioned adjacent to the cooking chamber 20, the cable unit 200 may be damaged by heat generated from the cooking chamber 20. Accordingly, the cable unit 200 may be shielded with a heat-resisting material to be prevented from being damaged by heat generated from the cooking chamber 20.

In the cable unit 200, if a part of the cable unit 200 to which the camera module 100 is connected and which is installed in the inside of the handle 50 is referred to as a first cable 210, a part of the cable unit 200 which extends from the first cable 210 to be installed in the inside of the door unit 400 is referred to as a second cable 220, and a part of the cable unit 200 which extends from the second cable 220 to be connected to the microcomputer 80 and which is installed in the inside of the case 10 is referred to as a third cable 230, the first separation area 240 may be located between the first cable 210 and the second cable 220 in order to separate the cable unit 200 into the first cable 210 and the second cable 220, and a second separation area 250 may be located between the second cable 220 and the third cable 230 in order to separate the cable unit 200 into the second cable 220 and the third cable 230.

The first cable 210 may include a first connecting member 211 installed in the inside of the handle 50 and connected to the camera module 100 at one end. Also, the first cable 210 may include a second connecting member 212 at the other end that is opposite to the end to which the first connecting member 211 is connected, the second connecting member 210 connected to the second cable 220. The second connecting member 212 may penetrate a part of the handle 50 connected to the door unit 40 so as to be exposed to the outside of the handle 50. The first cable 210 may include a bent part 213 at an area at which the handle support part 51 is connected to the handle extension part 52, between the first connecting member 211 and the second connecting member 212.

The second cable 220 may include a third connecting member 221 installed in the inside of the door unit 40 and connected to the second connecting member 212 at one end. The second cable 220 may include a fourth connecting member 222 at the other end that is opposite to the end to which the third connecting member 221 is connected, the fourth connecting member 222 connected to the third cable 230. The third connecting member 221 may penetrate the front part of the door unit 40 so as to be exposed to the outside of the door unit 40. That is, the third connecting member 221 may be disposed on the front part of the door unit 40. The fourth connecting member 222 may penetrate a part of the door unit 40 connected to the case 10 so as to be exposed to the outside of the door unit 40. The second cable 220 may be installed in the inside of the door unit 40 that does not correspond to the transparent portion 42, for the sake of external appearance.

The third cable 230 may include a fifth connecting member 231 installed in the inside of the case 10 and connected to the fourth connecting member 222 at one end. The third cable 230 may include a sixth connecting member 232 at the other end that is opposite to the end to which the fifth connecting member 231 is connected, the sixth connecting member 232 connected to the microcomputer 80. The fifth connecting member 231 may penetrate the front panel 11 so as to be exposed to the outside of the front panel 11. That is, the fifth connecting member 231 may be disposed on the front panel 11. The third cable 230 may extend from the microcomputer 80 to the insides of the rear panel 14 and the side panel 13, as described above.

The first separation area 240 may be located between the first cable 210 and the second cable 220. More specifically, the first separation area 240 may be located at an area at which the handle 50 is connected to the door unit 40.

At the first separation area 240, the first cable 210 may be separated from the second cable 220. More specifically, at the other end of the first cable 210, the second connecting member 212 may be provided to be coupled with the second cable 220, and at one end of the second cable 220, the third connecting member 221 may be provided to be coupled with the second connecting member 212 of the first cable 210.

The second connecting member 212 may be provided in the shape of a USB connector, and the third connecting member 221 may be provided in the shape of a USB port so that the second connecting member 212 can be inserted into and coupled with the third connecting member 221.

The third connecting member 221 may be attached on the front part of the door unit 40 by a screw or the like, and accordingly, the second connecting member 212 may be inserted into the front part of the door unit 40 so that the handle 50 can be coupled with or decoupled from the door unit 40.

A user may separate the handle 50 from the door unit 40, as necessary. If the handle 50 is separated from the door unit 40, the first cable 210 may be separated from the second cable 220 at the first separation area 240 so that the first cable 210 can be separated from the door unit 40 together with the handle 50.

Since the camera module 100 is disposed on the handle 50, the camera module 100 may also be separated from the door unit 40 when the handle 50 is separated from the door unit 40. Since the camera module 100 is connected to the microcomputer 80 by the cable unit 200, the handle 50 cannot be completely separated from the door unit 40 and the case 10 by the remaining part of the cable unit 200 extending to the insides of the door unit 40 and the case 10, if the cable unit 200 is not separated even when the handle 50 is separated from the door unit 40.

Accordingly, the first separation area 240 may enable a user to completely separate the handle 50 from the door unit 40 and the case 10.

At one end of the first cable 210, the first connecting member 211 may be provided to be connected to the camera module 100 so as to electrically connect the first cable 210 to the camera module 100.

Between the second cable 220 and the third cable 230, the second separation area 250 may be located. More specifically, the second separation area 250 may be located at an area at which the door unit 40 is connected to the case 10.

At the second separation area 250, the second cable 220 may be separated from the third cable 230. More specifically, at the other end of the second cable 220, the fourth connecting member 222 may be provided to be coupled with the third cable 230, and at one end of the third cable 230, the fifth connecting member 231 may be provided to be coupled with the fourth connecting member 222 of the second cable 220.

The fourth connecting member 222 may be provided in the shape of a USB connector, and the fifth connecting member 231 may be provided in the shape of a USB port so that the fourth connecting member 222 can be inserted into and coupled with the fifth connecting member 231.

The fifth connecting member 231 may be attached on the front panel 11 of the case 10 by a screw or the like, and accordingly, the fourth connecting member 222 may be inserted into the front panel 11 so that the door unit 40 can be coupled with or decoupled from the front panel 11.

The user may separate the door unit 40 from the case 10, as necessary. If the door unit 40 is separated from the case 10, the second cable 220 may be separated from the third cable 230 at the second separation area 250 so that the second cable 220 can be separated from the case 10 together with the door unit 40.

Since the camera module 100 is disposed on the handle 50, the camera module 100 may be separated from the case 10 when the door unit 40 is separated from the case 10. Since the camera module 100 is connected to the microcomputer 80 by the cable unit 200, the door unit 40 cannot be completely separated from the case 10 by the remaining part of the cable unit 200 extending to the inside of the case 10, if the cable unit 200 is not separated even when the door unit 40 is separated from the case 10.

Accordingly, the second separation area 250 may enable the user to completely separate the door unit 40 from the case 10.

At the other end of the third cable 230, the sixth connecting member 232 may be provided to be connected to the microcomputer 80 so as to electrically connect the third cable 230 to the microcomputer 30.

Hereinafter, a process in which the cable unit 200 is separated when the handle 50, the door unit 40, and the case 10 are respectively separated will be described.

In order to separate the handle 50 from the door unit 40, the user may pull the handle 50 in the front direction of the oven 1 to decouple the second connecting member 212 from the third connecting member 221 at the first separation area 240.

Also, in order to separate the door unit 40 from the case 10, the user may pull the door unit 40 in the front direction of the oven 1 to decouple the fourth connecting member 222 from the fifth connecting member 231 at the second separation area 250.

Successively, if the handle 50 and the door unit 50 are completely maintained and repaired, the above-described process may be performed in the reverse order so as to couple the handle 50 and the door unit 40 with the case 10. More specifically, the door unit 40 may be pressed in the back direction of the oven 1 so as to couple the fourth connecting member 222 with the fifth connecting member 231 at the second separation area 250, and the handle 50 may be pressed in the back direction of the oven 1 so as to couple the second connecting member 212 with the third connection member 221 at the first separation area 240.

As described above, since the cable unit 200 connected between the handle 50, the door unit 40, and the case 10 can be separated into several members, the manufacturing process of the oven 1 can be simplified, and components included in the oven 1 can be easily maintained and repaired.

That is, since the handle 50, the door unit 40, and the case 10 can be assembled after the handle 50, the door unit 40, and the case 10 are first assembled through an assembly process, the manufacturing process of the oven 1 can be simplified, which leads to an efficient increase of productivity.

Figure 18:
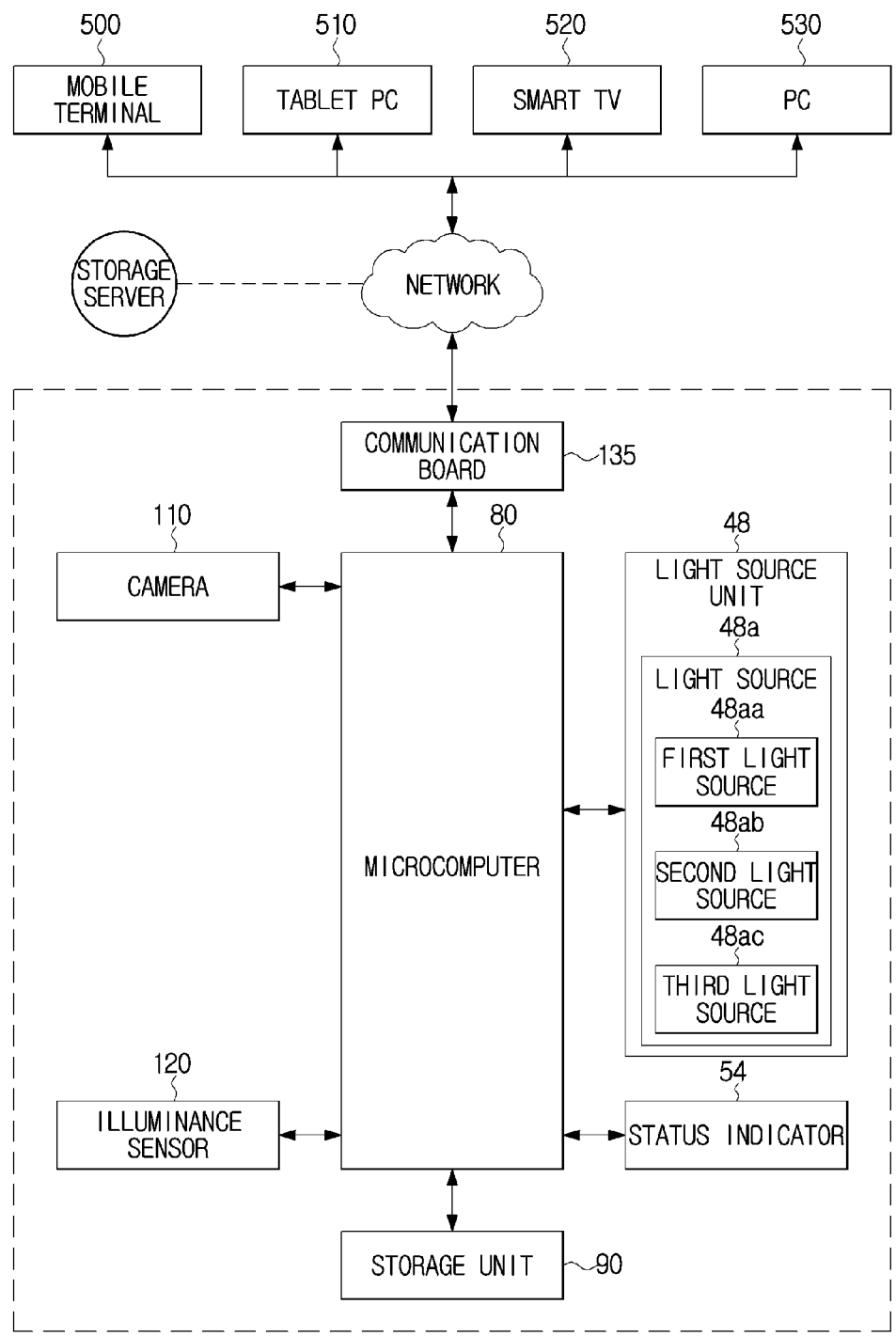
FIG. 18 is a control block diagram showing a control flow of the oven according to an embodiment of the present disclosure.
Figure 19:
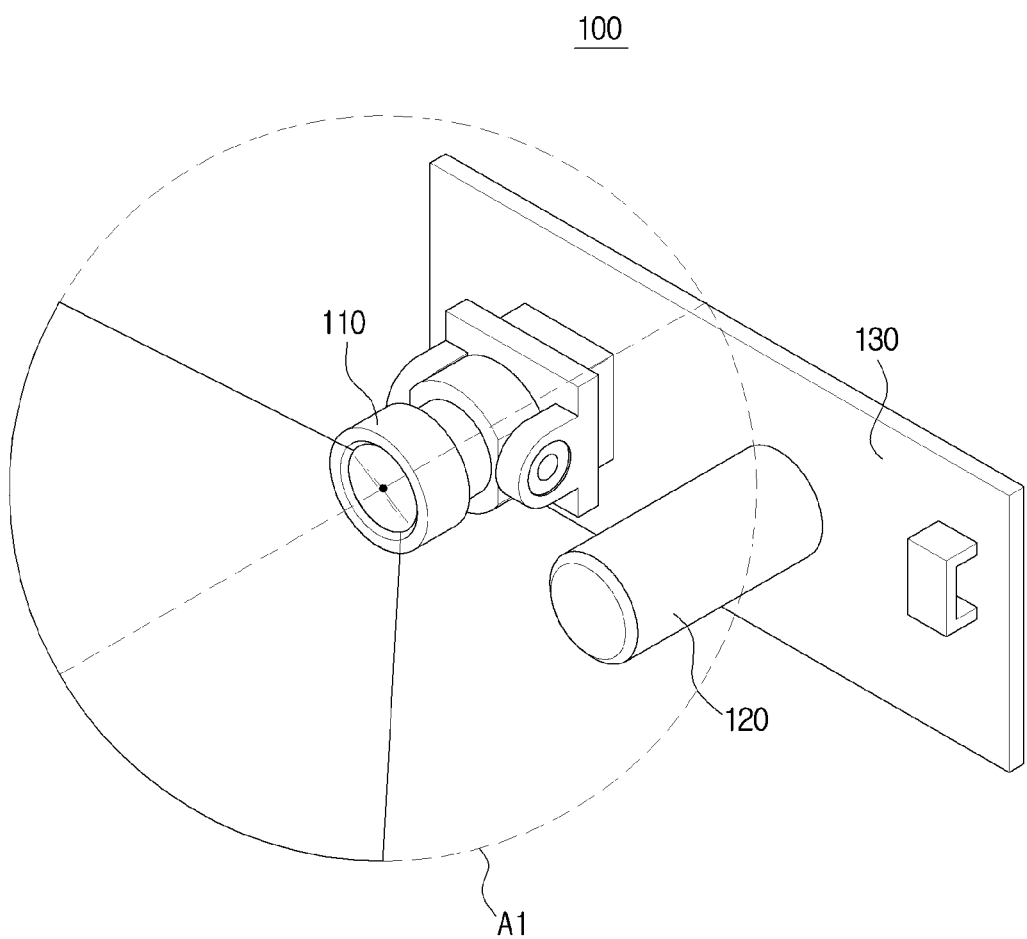
FIG. 19 shows the illuminance sensor that senses an illuminance of an area around the camera.

FIG. 18 is a control block diagram showing a control flow of the oven 1 according to an embodiment of the present disclosure. FIG. 19 shows the illuminance sensor 150 that senses an illuminance of an area around the camera 110.

Hereinafter, a control flow according to an embodiment of the present disclosure will be described with reference to FIGS. 19 to 22.

Referring to FIG. 18, the oven 1 according to an embodiment of the present disclosure may include the camera 110 to photograph the inside of the cooking chamber 20 to acquire image information, the illuminance sensor 120 to sense an illuminance of an area at which the camera 110 is disposed, the microcomputer 80 to control operations of the oven 1, the at least one light source 48a installed in the inside of the door unit 40 and configured to illuminate the inside of the door unit 40, the status indicator 54 to display an operation state of the camera 110, the communication board 135 to transmit information about an operation state of the oven 1 and image information acquired by the camera 110 to an external device, and a storage unit 90 to store data related to operations and control of the oven 1.

As shown in FIG. 11, the at least one light source 48a may be installed in the inside of the door unit 40, and turned on according to the control of the microcomputer 80 to illuminate the inside of the door unit 40. A user may input a control command for turning on/off the at least one light source 48a, and the microcomputer 80 may transmit a control signal for turning on/off the at least one light source 48a based on the control command input by the user.

The at least one light source 48a may include, as described above, the first light source 48aa, the second light source 48ab, and the third light source 48ac, and the first, second, and third light sources 48aa, 48ab, and 48ac may be controlled independently or simultaneously by the control of the microcomputer 80.

The door unit 40 according to an embodiment of the present disclosure may include, as described above, the light source unit 48 therein. The light source unit 48 may be selectively illuminated in the inside of the door unit 40 by the microcomputer 80 which will be described later, and the light source unit 48 may include the plurality of light sources 48a. Each of the first, second, and third light sources 48aa, 48ab, and 48ac included in the plurality of light sources 48a may be arranged in pairs, as shown in FIG. 12, however, the numbers of the first, second, and third light sources 48aa, 48ab, and 48ac are not limited.

Also, the first, second, and third light sources 48aa, 48ab, and 48ac included in the plurality of light sources 48a may be individually illuminated. Since the plurality of light sources 48a can be individually illuminated by the microcomputer 80, the user can adjust the brightness of the inside of the door unit 40.

Also, the at least one light source 48a may be, as described above, disposed at the lateral sides of the door unit 40, as shown in FIG. 11, however, the light source 48a may be disposed at any other location as long as it can illuminate the inside of the door unit 40. Also, the number of the light sources 48a is not limited, and all or a part of the plurality of light sources 48a may be selectively turned on/off.

As shown in FIG. 12, in the inside of the door unit 40, the plurality of glass members 43 may be provided to partition the inside space of the door unit 40. That is, if four glass members 43 are installed according to an embodiment of the present disclosure, the inside space of the door unit 40 may be partitioned into three spaces S1, S2, and S3 with the glass members 43 in between.

The first, second, and third light sources 48aa, 48ab, and 48ac included in the plurality of light sources 48a may be arranged to the left and/or right of the door unit 40 to provide light to the spaces S1, S2, and S3 between the plurality of glass members 43. More specifically, the first, second, and third light sources 48aa, 48ab, and 48ac may be respectively arranged between the plurality of glass members 43 so that the first light source 48aa can provide light to the first space S1, the second light source 48ab can provide light to the second space S2, and the third light source 48ac can provide light to the third space S3.

However, the plurality of light sources 48a may be arranged in the upper and/or lower sides of the door unit 40 so as to provide light to the spaces between the plurality of glass members 43. That is, the first, second, and third light sources 48aa, 48ab, and 48ac included in the plurality of light sources 48a may be arranged at any locations as long as they can provide light to the inside space of the door unit 40.

The light sources 48a provided in the inside of the door unit 40 may be used to prevent the camera 110 from unclearly photographing the inside of the cooking chamber 20 due to glass provided in the inside of the door unit 40.

The microcomputer 80 may transmit a control signal for adjusting the illuminance of the at least one light source 48a so that the brightness of the light source 48a can be adjusted by the control signal, which will be described later.

The microcomputer 80 may control the first, second, and third light sources 48aa, 48ab, and 48ac included in the plurality of light sources 48a, individually, to turn on/off the first, second, and third light sources 48aa, 48ab, and 48ac, or the microcomputer 80 may control the first, second, and third light sources 48aa, 48ab, and 48ac at the same time to turn on/off the first, second, and third light sources 48aa, 48ab, and 48ac.

That is, the microcomputer 80 may turn on the first light source 48aa to illuminate the first space S1, turn on the second light source 48ab to illuminate the second space S2, and turn on the third light source 48ac to illuminate the third space S3. A detailed control flow about the operation will be described with reference to FIGS. 24A and 24B, later.

The camera 110 may photograph the inside of the cooking chamber 20 to acquire image information. As shown in FIG. 5, the camera 110 may be installed in the handle 50 provided in the outside of the door unit 40, and in a depression in the outer surface of the handle 50.

The user may input a control command for controlling operation of the camera 110 through input means provided in an external device or the oven 1, so that the microcomputer 80 may operate the camera 110 and transmit a control signal for photographing the inside of the cooking chamber 20, according to the control command.

The camera 110 may photograph the inside of the cooking chamber 20 according to the control of the microcomputer 80 to acquire image information, and the acquired image information may be transmitted to the external device through the communication board 135. A photographing time, a photographing period, etc. for which the camera 110 photographs the inside of the cooking chamber 20 may be set to arbitrary values, and the camera 110 may photograph a picture or video of the inside of the cooking chamber 20.

Also, the camera 110 may photograph the inside of the cooking chamber 20 multiple times with time intervals to acquire a plurality of image information, and the plurality of image information may be sequentially transmitted to the external device through the communication board 135.

The user may check the image information acquired by the camera 110 through the external device to thereby recognize the cooking state of food, etc. placed in the inside of the cooking chamber 20.

The camera 110 may rotate in the up, down, left, and right directions according to the control of the microcomputer 80 to change an angle at which the inside of the cooking chamber 20 is photographed.

The illuminance sensor 120 may sense an illuminance of an area around the camera 110. That is, as shown in FIG. 19, the illuminance sensor 120 may be spaced a predetermined distance from the camera 110 in the inside of the handle 50, and sense an illuminance around a lens included in the camera 110 to transmit the sensed illuminance to the microcomputer 80.

As described above, the camera 110 can photograph the inside of the cooking chamber 20, and at this time, the definition of an inside image of the cooking chamber 20 photographed via the door unit 40 may depend on brightness around the camera 110. That is, if brightness around the camera 110 is dark, an inside image of the cooking chamber 20 may be acquired as a clear image even at low brightness of the at least one light source 48a installed in the door unit 40, whereas if brightness around the camera 110 is bright, the brightness of the at least one light source 48a installed in the door unit 40an may need to be brighter in order to acquire a clear inside image of the cooking chamber 20.

Accordingly, the illuminance of the light source 48a installed in the inside of the door unit 40 may be adjusted based on an illuminance around the camera 110 sensed by the illuminance sensor 120 so that the camera 110 can acquire a clearer inside image of the cooking chamber 20.

The illuminance sensor 120 may be a configuration to measure an amount of incident light to sense ambient brightness, and may be any sensor that can sense an illuminance.

Referring to FIG. 19, the illuminance sensor 120 may sense an illuminance of an area A1 around the camera 110. More specifically, the illuminance sensor 120 may sense an illuminance of an area in the range of a predetermined distance from the lens of the camera 110. That is, since it is necessary to measure an illuminance of an area at which the camera 110 is located and to compare the measured illuminance to the brightness of the light source 48*a* installed in the door unit 40, illuminance information sensed by the illuminance sensor 120 positioned adjacent to the camera 110, as shown in FIG. 19, can be transmitted to the microcomputer 80.

The microcomputer 80 may adjust an illuminance of at least one light source 48*a* installed in the inside of the door unit 40, based on the illuminance of the area around the camera 110, sensed by the illuminance sensor 120. More specifically, if the illuminance sensor 120 senses an illuminance of the area around the camera 110 and transfers the sensed illuminance to the microcomputer 80, the microcomputer 80 may set an illuminance of at least one light source 48*a* installed in the inside of the door unit 40 to a value that is higher than the illuminance sensed by the illuminance sensor 120.

For example, if the illuminance sensor 120 senses the illuminance of the area around the camera 110 as 500 lux, the microcomputer 80 may set the illuminance of the light source 48*a* installed in the inside of the door unit 40 to 600 lux that is higher than 500 lux.

The microcomputer 80 may turn on at least one light source 48*a* based on the set illuminance, such that an illuminance by the light source 48*a* selectively turned on from among the at least one light source 48*a* installed in the inside of the door unit 40 corresponds to the set illuminance.

Also, the microcomputer 80 may control the camera 110 to adjust the position of the lens in the up, down, left, and right direction to adjust an angle at which the inside of the cooking chamber 20 is photographed. Furthermore, if a control signal for photographing the inside of the cooking chamber 20 is received, the microcomputer 80 may transmit a control signal for turning on the status indicator 54 provided in the handle 50, and if operation of photographing the inside of the cooking chamber 20 is finished, the microcomputer 80 may transmit a control signal for turning off the status indicator 54.

The microcomputer 80 may control operations of the oven 1, based on commands related to the control of the oven 1, received through the input means included in the external device or the oven 1.

The microcomputer 80 can be defined as a configuration including a microcomputer in the form of a chip, a board on which the microcomputer is mounted, and various kinds of electronic devices such as a power supply mounted on the board and configured to operate the microcomputer.

The status indicator 54 may be disposed in the handle 50 provided in the outside of the door unit 40, turned on before the camera 110 photographs the inside of the cooking chamber 20, and turned off after photographing of the camera 110 is finished. The status indicator 54 may have any configuration and be disposed at any location. The user can intuitively recognize operation of the camera 110 by recognizing the turned-on/off state of the status indicator 54.

The communication board 135 may perform communication between the oven 1 and the external device. That is, the communication board 135 may transmit/receive information to/from the external device through a network, and load information related to operations or control of the oven 1 stored in an external storage sever or store information in a storage server.

The communication board 135 may transmit image information of the inside of the cooking chamber 20 photographed by the camera 110 to the external device, and receive information related to the control of the oven 1 set by the external device. The communication board 135 may transmit information generated in the oven 1 and receive information from the external device, through various communication methods.

The communication board 135 may transmit/receive radio signals through a communication method, such as, for example, 3Generation (3G) communication or 4Generation (4G) communication. Also, the communication board 135 may include at least one short-range communication module, such as a Bluetooth communication module to perform one-to-one communication with a single external device or one-to-multi communication with a plurality of external devices, a Wireless Fidelity (WiFi) communication module to connect to a Local Area Network (LAN) through an Access Point (AP), a Zigbee communication module to form a short-range communication network between a storage unit and an external device, and the like. Also, the communication board 135 may transmit/receive information within a predetermined distance through a communication method, such as Wi-Fi Direct (WFD), Ultra WideBand (UWB), Infrared Data Association (IrDA), Bluetooth Low Energy (BLE), Near Field Communication (NFC), and the like. However, a communication module that can be included in the communication board 135 is not limited to the Bluetooth communication module, the WiFi communication module, and the short-range communication module, and the communication board 135 may include any other communication module that performs communication according to various communication protocols.

The external device may be any device which a user can use outside the oven 1, and may include at least one of a mobile terminal 500, a tablet PC 510, a smart TV 520, and a PC 530. The user can control operations of the oven 1 through the external device when he/she is distant from the oven 1. Hereinafter, embodiments of the present disclosure will be described under an assumption that the external device is a mobile terminal 500.

The storage unit 90 may store a control program or control data for controlling operations of the oven 1, or store control command data output from the microcomputer 80.

That is, the storage unit 90 may store illuminance information sensed by the illuminance sensor 120 with respect to an area around the camera 110. The microcomputer 80 may adjust an illuminance of at least one light source 48*a* installed in the door unit 40 based on the illuminance information stored in the storage unit 90, and change the illuminance of the light source 48*a* based on the stored illuminance information if an illuminance sensed by the illuminance sensor 120 changes when the camera 110 is photographing the inside of the cooking chamber 20.

The storage unit 90 may store image information acquired by the camera 110. That is, a picture or video of the inside of the cooking chamber 20 photographed by the camera 110 may be transmitted to the external device through the communication board 135, and simultaneously stored in the storage unit 90 so that the user can check the image information as necessary. Also, the storage unit 90 may store data related to the control of the oven 1, set by the user through the external device.

The storage unit 90 may include at least one type of storage medium, among a flash memory type, a hard disk type, a multimedia card micro type, a card type memory (for example, Secure Digital (SD) memory or Extreme Digital (EX) memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

Figure 20:
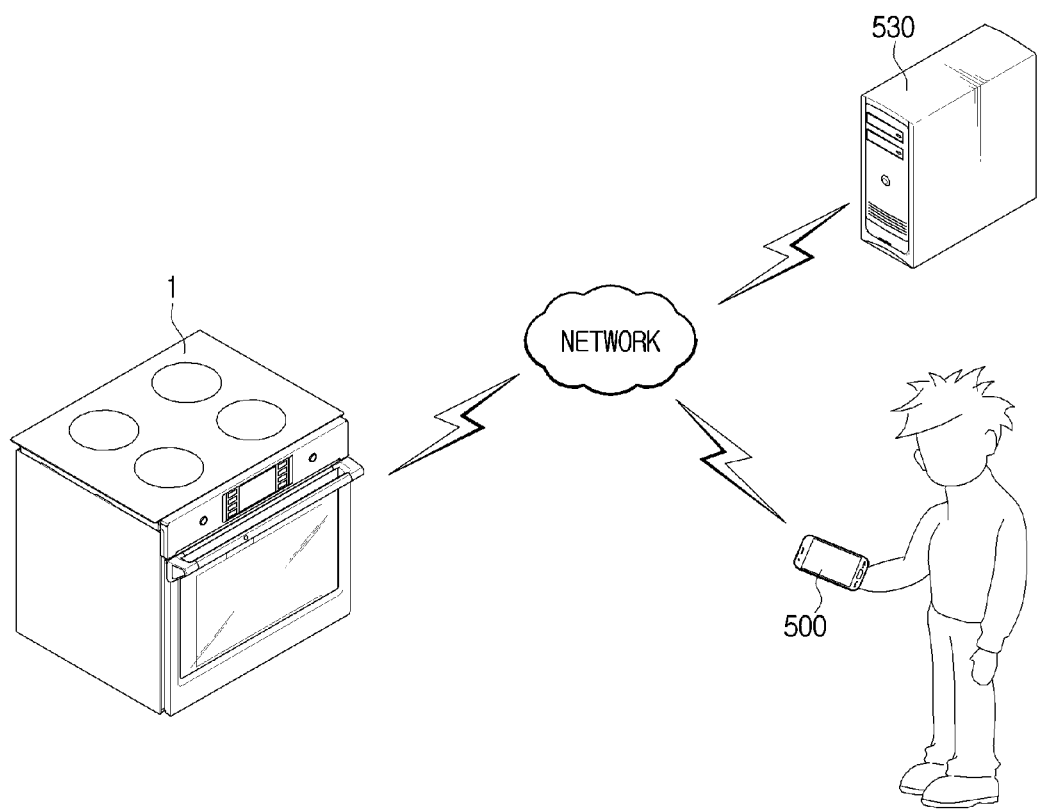
FIG. 20 is a conceptual view for describing a method of controlling operations of the oven through the external device, according to an embodiment of the present disclosure.
Figure 21:
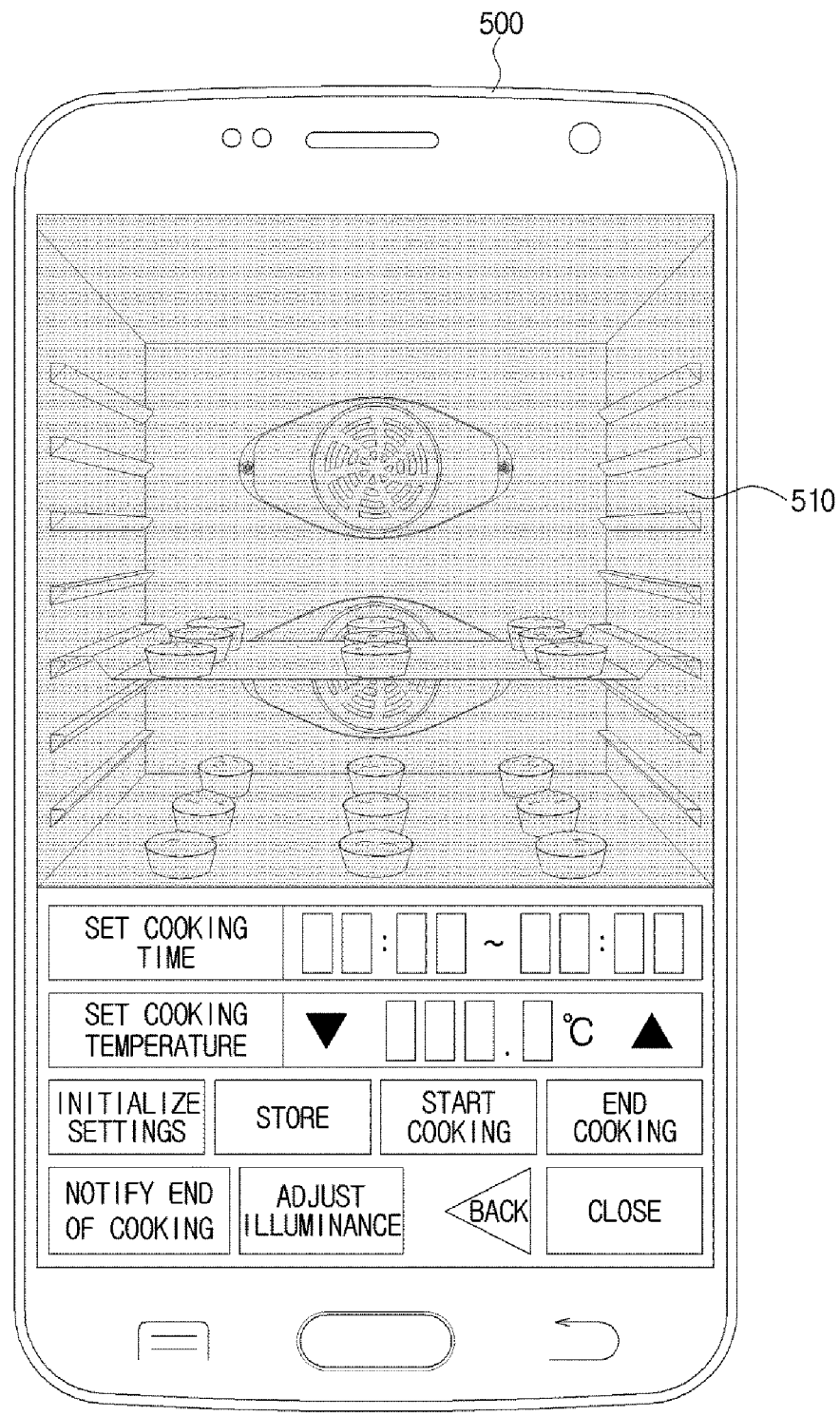
FIGS. 21 and 22 show inside images of the cooking chamber photographed by the camera and displayed on the external device, according to an embodiment of the present disclosure.
Figure 22:
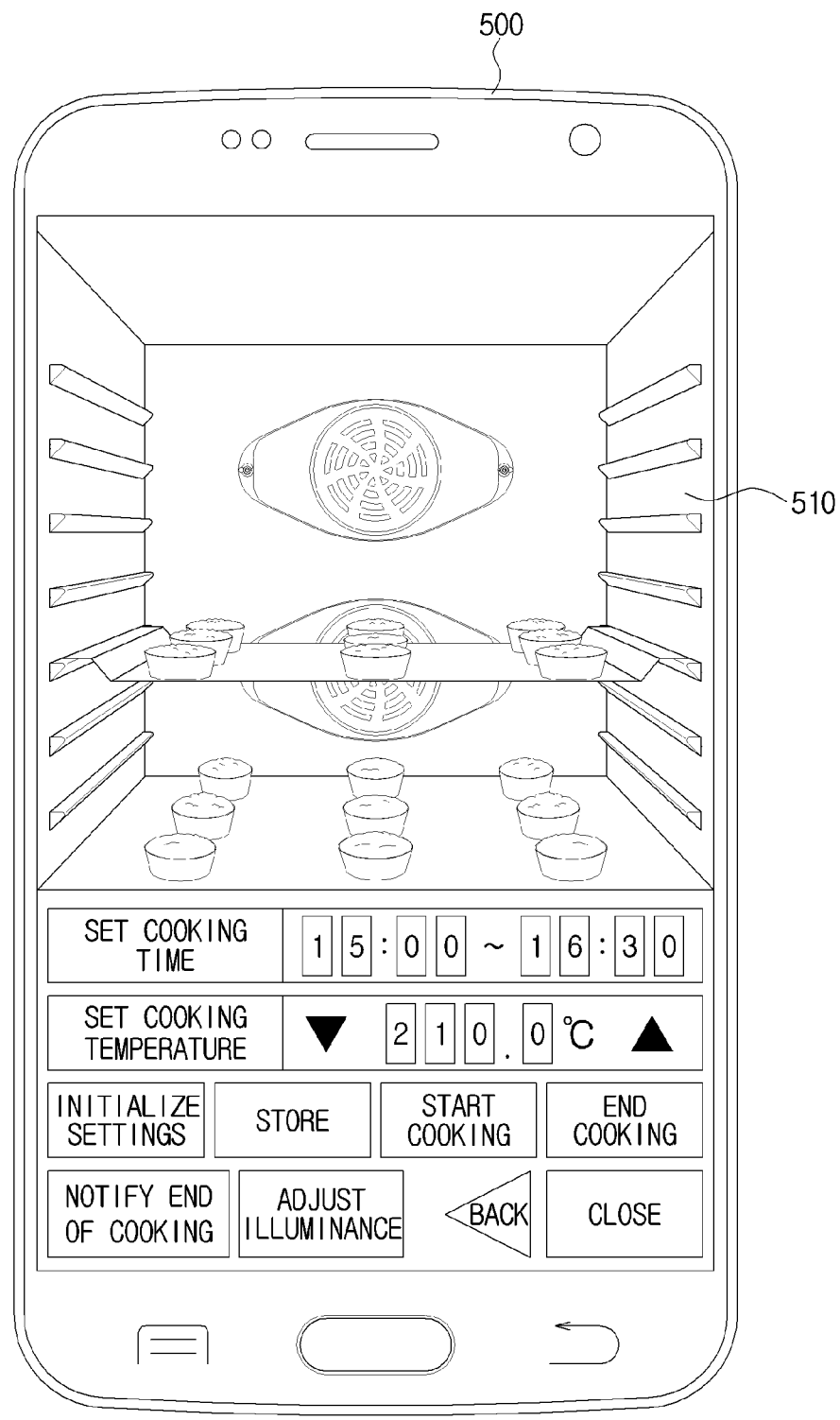

FIG. 20 is a conceptual view for describing a method of controlling operations of the oven 1 through the external device 500, according to an embodiment of the present disclosure, and FIGS. 21 and 22 show inside images of the cooking chamber 20 photographed by the camera 110 and displayed on the external device 500, according to an embodiment of the present disclosure.

As shown in FIG. 20, the oven 1 and the external device 500 may perform communication or transmit/receive information through the communication board 135 included in the oven 1. That is, a user may input a control command related to operation of the oven 1 through the external device 500, and the control command may be received by the communication board 135 of the oven 1 through a network.

Image information of the inside of the cooking chamber 20 acquired by the camera 110 may be transmitted to the external device 500 through the network so that the user can recognize the cooking state of food placed in the inside of the cooking chamber 20 through the external device 500 even when he/she is distant from the oven 1. The user can see an image of food, etc. photographed by the camera 110, and input a control command related to cooking of the food to the external device, without having to directly manipulate the oven 1 or see the cooking state of the food, resulting in increasing the user's convenience.

As shown in FIG. 21, image information of the inside of the cooking chamber 20 acquired by the camera 110 may be transmitted to the external device 500 through the communication board 135, and the image information may be displayed on a display unit 510 of the external device 500. In FIG. 21, an embodiment in which the external device 500 is a mobile terminal is shown.

FIG. 21 corresponds to an image taken when or before food put into the inside of the cooking chamber 20 of the oven 1 is cooked. If the illuminance of the inside of the cooking chamber 20 that is photographed by the camera 110 is low, the photographed image may be dark.

If the illuminance of the area around the camera 110 is high and the illuminance of the at least one light source 48a installed in the door unit 40 is low, as described above, an image of the inside of the cooking chamber 20 photographed by the camera 110 may be dark and unclear. The photographed image of the inside of the cooking chamber 20 as shown in FIG. 21 is an example of the case, and in this case, the illuminance of the at least one light source 48a installed in the door unit 40 may need to be adjusted to be higher than the illuminance of the area around the camera 110.

FIG. 22 shows a bright image of the inside of the cooking chamber 20 photographed by the camera 110, compared to the image of FIG. 21. That is, if a photographing signal for the camera 110 is input, the illuminance sensor 120 senses an illuminance of an area around the camera 110 so that an illuminance of the at least one light source 48a installed in the inside of the door unit 40 is adjusted according to the sensed illuminance, and then the camera 110 photographs the inside of the cooking chamber 20, the inside of the cooking chamber 20 can be photographed as a bright image.

For example, if the illuminance of the area around the camera 110 sensed by the illuminance sensor 120 is 550 lux, and the illuminance of the at least one light source 48a installed in the door unit 40 is 500 lux, the inside of the cooking chamber 20 may be photographed as a dark image, as shown in FIG. 21, and if the illuminance of the at least one light source 48a installed in the door unit 40 is 600 lux when the illuminance of the area around the camera 110 sensed by the illuminance sensor 120 is 550 lux, the inside of the cooking chamber 20 may be photographed as a bright image, as shown in FIG. 22.

Accordingly, the user may see an image of the inside of the cooking chamber 20 brightly photographed by the camera 110 to check a cooking state and a degree of cooking progress of food placed in the cooking chamber 20, and additionally input a control command for adjusting the illuminance of the light source 48a of the door unit 40 based on the brightness of the image.

As shown in FIG. 22, the user may check a cooking state of food placed in the cooking chamber 20 of the oven 1 through the external device 500, and input a control command related to cooking of the food by manipulating the external device 500 when the user is distant from the oven, which leads to the user's convenience.

As shown in FIGS. 21 and 22, if the external device 500 is a mobile terminal, the user may input a control command related to the control of the oven 1 through the mobile terminal 500, and the control command may be transferred to the microcomputer 80 through the communication board 135 to be used to control the oven 1.

Referring to FIG. 22, the user may set a cooking time and a cooking temperature of food accommodated in the oven 1 through an interface displayed on the mobile terminal 500. If the mobile terminal 500 includes a touch panel for receiving a user's touch inputs, the user may touch the mobile terminal 500 to input a control command.

The user may set a cooking time and a cooking temperature for food accommodated in the oven 1. That is, the user may extend or reduce a cooking time of food, or raise or lower a cooking temperature of the food, according to a cooking state of the food based on an image of the food photographed by the camera 110.

Also, since data about cooking times and cooking temperatures for foods has already been stored in the storage unit 90, the microcomputer 80 may perform automatic control based on the data.

If the user sets a cooking time and a cooking temperature of food through the mobile terminal 500, the set information may be transferred to the microcomputer 80 of the oven 1 through the communication board 135, and the microcomputer 80 may control cooking of the food accommodated in the oven 1 based on the cooking time and the cooking temperature set by the user.

The user may input a control command for initializing a set condition, store a newly set control command, or input a control command for starting or finishing cooking food, in addition to setting a cooking time or a cooking temperature of food.

Also, the user may input a control command for sending notification informing the end of cooking if food accommodated in the oven 1 is completely cooked according to the user's setting. The microcomputer 80 may transmit a control signal informing the end of cooking to the user, based on the control command.

As described above, the microcomputer 80 may perform control related to cooking of food accommodated in the oven 1 based on setting values set in advance by the user and stored in the storage unit 90, although the user inputs no control command related to cooking of the food through the external device 500.

Figure 23:
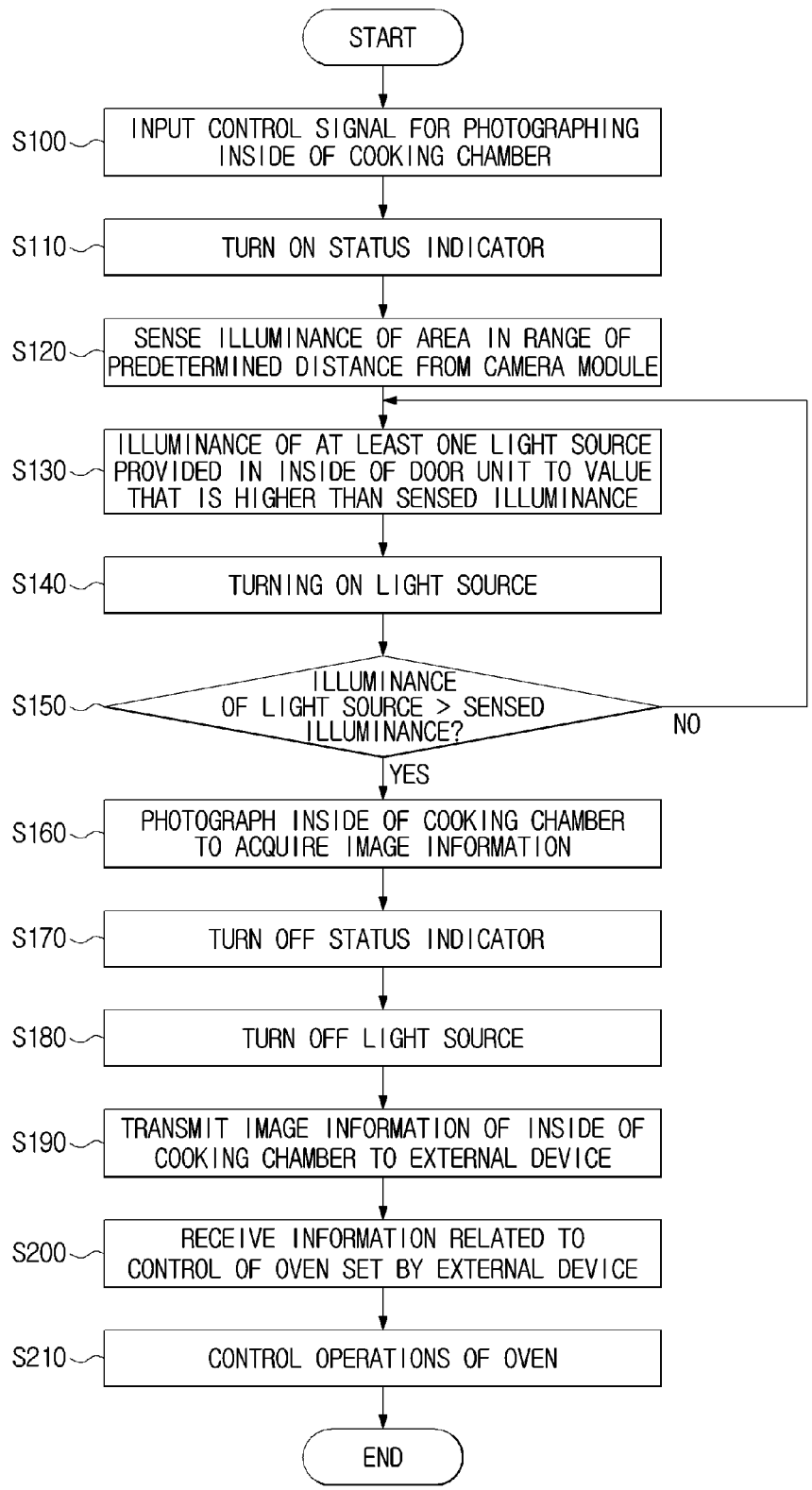
FIG. 23 is a flowchart illustrating a method of controlling the oven, according to an embodiment of the present disclosure.
Figure 24:
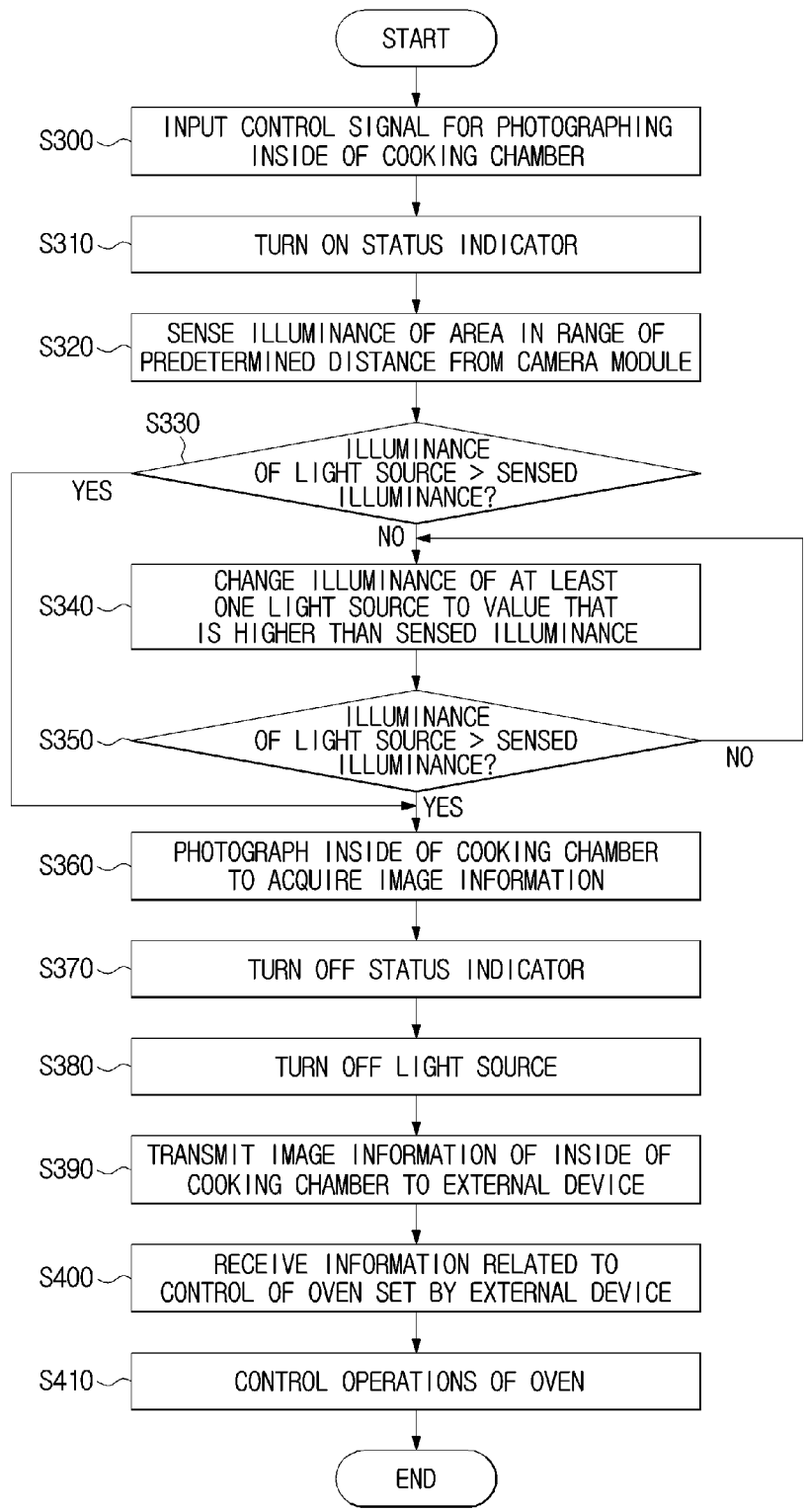
FIGS. 24, 25A, and 25B are flowcharts illustrating methods of controlling the oven, according to other embodiments of the present disclosure.
Figure 25A:
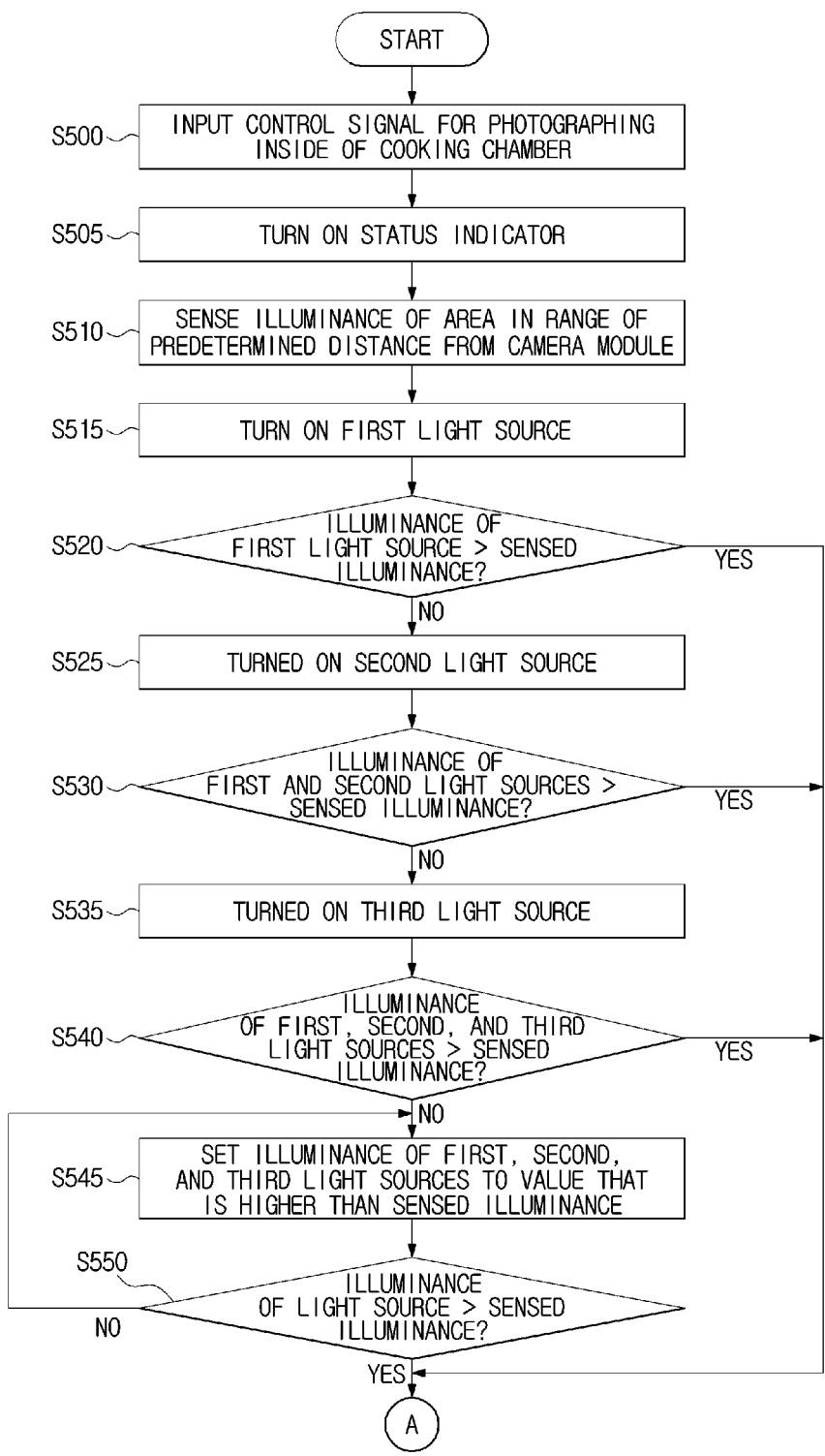
Figure 25B:
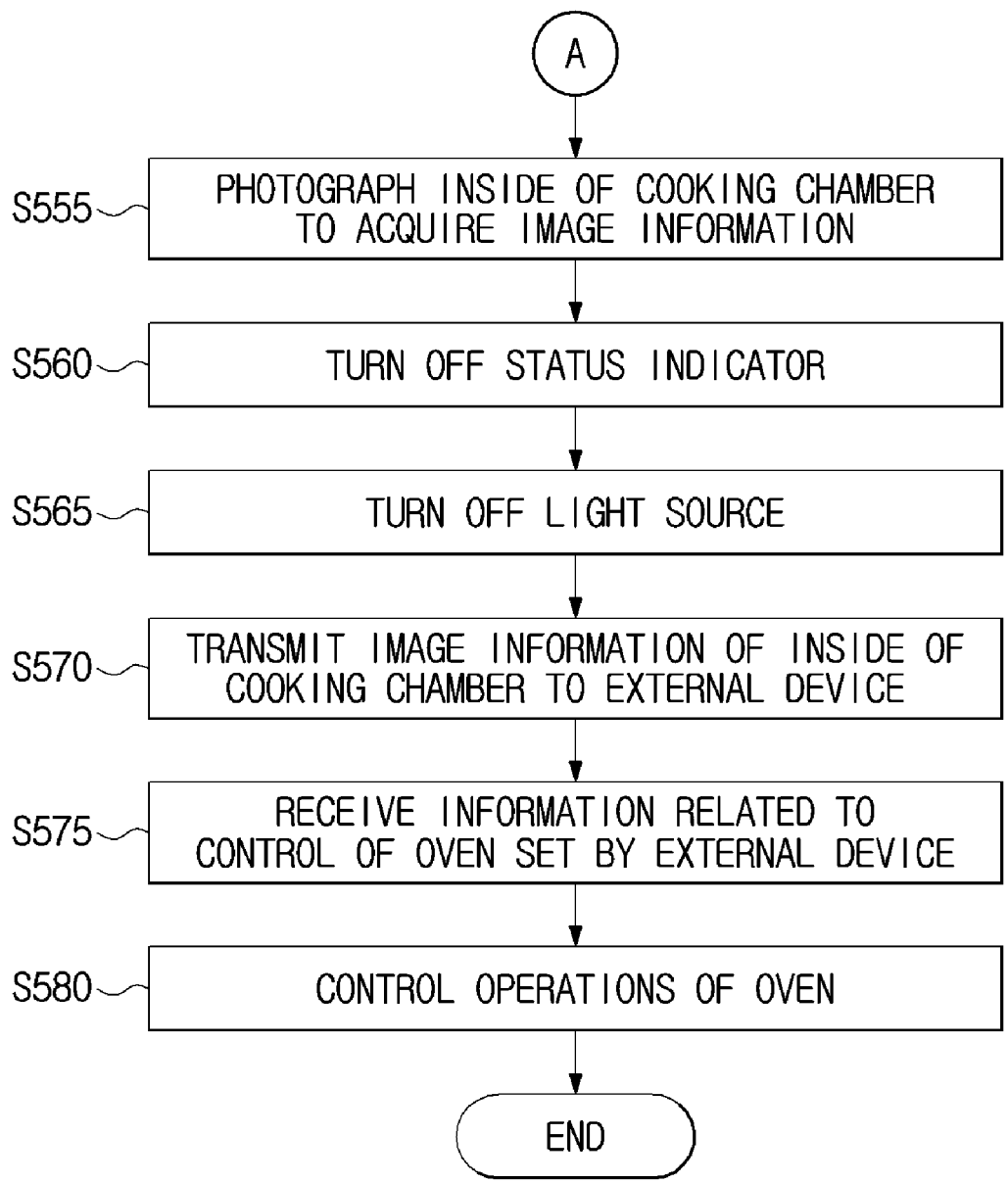

FIG. 23 is a flowchart illustrating a method of controlling the oven 100, according to an embodiment of the present disclosure. FIGS. 24, 25A, and 25B are flowcharts illustrating methods of controlling the oven 100, according to other embodiments of the present disclosure.

Referring to FIG. 23, if a user inputs a control command for photographing the inside of the cooking chamber 20 through input means provided in the oven 1 or through an external device, in operation S100, the microcomputer 80 may transmit a control signal for photographing the inside of the cooking chamber 20.

The control signal for photographing the inside of the cooking chamber 20 may be, instead of being transmitted according to a control command input by the user, transmitted by a control command set in advance by the user and stored in the storage unit 90.

If the control signal for photographing the inside of the cooking chamber 20 is input, the status indicator 54 disposed in the handle 50 of the oven 1 may be turned on before the camera 110 is turned on, in operation S110. The status indicator 54, which enables the user to check whether the camera 110 for photographing the inside of the cooking chamber 20 operates properly, may be turned on before the camera 110 photographs the inside of the cooking chamber 20, and turned off after the camera 110 photographs the inside of the cooking chamber 20, according to the control of the microcomputer 80.

A time at which the status indicator 54 is turned on/off may depend on the user's settings, and a location at which the status indicator 54 is disposed may also be not limited.

Before the camera 110 photographs the inside of the cooking chamber 20, the illuminance sensor 120 may sense an illuminance of an area in the range of a predetermined distance from the camera 110, in operation S120. That is, if the illuminance sensor 120 senses an illuminance of an area around the camera 110 and transmits the sensed illuminance information to the microcomputer 80, the microcomputer 80 may adjust an illuminance of the at least one light source 48a installed in the door unit 40 based on the received illuminance information.

The microcomputer 80 may set an illuminance of the at least one light source 48a installed in the inside of the door unit 40 to a value that is higher than the illuminance sensed by the illuminance sensor 120, in operation S130. If the illuminance of the at least one light source 48a installed in the inside of the door unit 40 is higher than the illuminance of the area around the camera 110, the camera 110 will be able to acquire a bright image of food accommodated in the cooking chamber 20.

The microcomputer 80 may decide an illuminance of the at least one light source 48a, and transmit a control signal for turning on the at least one light source 48a based on the decided illuminance value, in operation S140.

After the at least one light source 48a installed in the inside of the door unit 40 is turned on, the microcomputer 80 may determine whether the illuminance of the turned-on light source 48a is higher than the illuminance of the area around the camera 110, in operation S150. If the microcomputer 80 determines that the illuminance of the turned-on light source 48a is not higher than the illuminance sensed by the illuminance sensor 120, the microcomputer 80 may again set an illuminance of the at least one light source 48a installed in the door unit 40 to a value that is higher than the illuminance sensed by the illuminance sensor 120.

If the microcomputer 80 determines that the illuminance of the at least one light source 48a is higher than the illuminance sensed by the illuminance sensor 120, the microcomputer 80 may control the camera 110 to photograph the inside of the cooking chamber 20 to acquire image information of food accommodated in the cooking chamber 20, in operation S160.

After the camera 110 photographs the inside of the cooking chamber 20, the status indicator 54 informing whether the camera 110 operates properly may be turned off, in operation S170. Also, after the camera 110 photographs the inside of the cooking chamber 20, the at least one light source 48a installed in the inside of the door unit 40 may also be turned off, in operation S180. As described above, times at which the status indicator 54 and the light source 48a are turned on/off may be set by the user.

The microcomputer 80 may control the communication board 135 to send a control signal for transmitting image information of the inside of the cooking chamber 20 acquired by the camera 110 to the external device, and the image information of the inside of the cooking chamber 20 may be transmitted to the external device through a network, in operation S190.

The user may check a cooking state of food accommodated in the inside of the cooking chamber 20 based on the image information received through the external device, and input a control command related to the control of the oven 1 through the external device.

The communication board 135 of the oven 1 may receive information related to the control of the oven 1, set by the user through the external device, through the network, in operation S200.

The microcomputer 80 may control operations of the oven 1 based on control information received by the communication board 135, in operation S210. More specifically, the microcomputer 80 may control cooking of food accommodated in the oven 1 according to a time or temperature set by the user.

As such, since the user can control cooking of food through the external device based on image information of the food photographed by the camera 1, the user can control the oven 1 conveniently even when he/she is distant from the oven 1.

FIG. 24 is a flowchart illustrating a method in which the illuminance sensor 120 senses an illuminance of an area around the camera 110 and adjusts an illuminance of the at least one light source 48a installed in the inside of the door unit 40 based on the sensed illuminance, when the light source 48a is in a turned-on state, unlike the method of FIG. 23.

Referring to FIG. 24, if a user inputs a control command for photographing the inside of the cooking chamber 20 through input means provided in the oven 1 or through an external device, in operation S300, the microcomputer 80 may transmit a control signal for photographing the inside of the cooking chamber 20.

Like the method of FIG. 23, the control signal for photographing the inside of the cooking chamber 20 may be, instead of being transmitted according to a control command input by the user, transmitted by a control command set in advance by the user and stored in the storage unit 90.

If the control signal for photographing the inside of the cooking chamber 20 is input, the status indicator 54 disposed in the handle 50 of the oven 1 may be turned on before the camera 110 is turned on, in operation S310. The status indicator 54, which enables the user to check whether the camera 110 for photographing the inside of the cooking chamber 20 operates properly, may be turned on before the camera 110 photographs the inside of the cooking chamber 20, and turned off after the camera 110 photographs the inside of the cooking chamber 20, according to the control of the microcomputer 80.

Before the camera 110 photographs the inside of the cooking chamber 20, the illuminance sensor 120 may sense an illuminance of an area in the range of a predetermined distance from the camera 110, in operation S320. Unlike the method of FIG. 23, when the camera 110 photographs the inside of the cooking chamber 20 in the state that the at least one light source 48a installed in the inside of the door unit 40 is turned on, the illuminance of the light source 48a installed in the door unit 40 may need to be adjusted. That is, if the illuminance sensor 120 senses an illuminance of an area around the camera 110 and transmits information of the sensed illuminance to the microcomputer 80, the microcomputer 80 may adjust an illuminance of the at least one light source 48a installed in the door unit 40 based on the information of the sensed illuminance.

The microcomputer 80 may determine whether the illuminance of the at least one light source 48 installed in the inside of the door unit 40 and being in the turned-on state is higher than the illuminance of the area around the camera 110, in operation S330. If the microcomputer 80 determines that the illuminance of the light source 48a is not higher than the illuminance sensed by the illuminance sensor 120, the microcomputer 80 may change an illuminance of the light source 48a installed in the inside of the door unit 40 to a value that is higher than the illuminance sensed by the illuminance sensor 120, in operation S340.

After the microcomputer 80 changes the illuminance of the light source 48a, the microcomputer 80 may determine whether an illuminance of the at least one light source 48 installed in the inside of the door unit 40 and being in the turned-on state is higher than the illuminance of the area around the camera 110, in operation S350. If the microcomputer 80 determines that the illuminance of the light source 48a is not higher than the illuminance sensed by the illuminance sensor 120, the microcomputer 80 may again change the illuminance of the at least one light source 48a installed in the inside of the door unit 40 to a value that is higher than the illuminance sensed by the illuminance sensor 120, in operation S340.

If the microcomputer 80 determines that the illuminance of the light source 48a is higher than the illuminance sensed by the illuminance sensor 120, the microcomputer 80 may control the camera 110 to photograph the inside of the cooking chamber 20 to acquire image information of food accommodated in the cooking chamber 20, in operation S360.

After the camera 110 photographs the inside of the cooking chamber 20, the status indicator 54 informing whether the camera 110 operates properly may be turned off, in operation S370. Also, after the camera 110 photographs the inside of the cooking chamber 20, the at least one light source 48a installed in the inside of the door unit 40 may be turned off, in operation S380. As described above, times in which the status indicator 54 and the light source 48a are turned on/off may be set by the user.

The microcomputer 80 may control the communication board 135 to send a control signal for transmitting image information of the inside of the cooking chamber 20 acquired by the camera 110 to the external device, and the image information of the inside of the cooking chamber 20 may be transmitted to the external device through the network, in operation S390.

The user may check a cooking state of food accommodated in the inside of the cooking chamber 20 based on the image information received through the external device, and input a control command related to the control of the oven 1 through the external device.

The communication board 135 of the oven 1 may receive information related to the control of the oven 1, set by the user through the external device, through the network, in operation S400.

The microcomputer 80 may control operations of the oven 1 based on control information received by the communication board 135, in operation S410. More specifically, the microcomputer 80 may control cooking of food accommodated in the oven 1 according to a time or temperature set by the user.

Referring to FIGS. 25A and 25B, if a user inputs a control command for photographing the inside of the cooking chamber 20 through input means provided in the oven 1 or through an external device, in operation S500, the microcomputer 80 may transmit a control signal for photographing the inside of the cooking chamber 20.

The control signal for photographing the inside of the cooking chamber 20 may be, instead of being transmitted according to a control command input by the user, transmitted by a control command set in advance by the user and stored in the storage unit 90.

If the control signal for photographing the inside of the cooking chamber 20 is input, the status indicator 54 disposed in the handle 50 of the oven 1 may be turned on before the camera 110 is turned on, in operation S505. The status indicator 54, which enables the user to check whether the camera 110 for photographing the inside of the cooking chamber 20 operates properly, may be turned on before the camera 110 photographs the inside of the cooking chamber 20, and turned off after the camera 110 photographs the inside of the cooking chamber 20, according to the control of the microcomputer 80.

Before the camera 110 photographs the inside of the cooking chamber 20, the illuminance sensor 120 may sense an illuminance of an area in the range of a predetermined distance from the camera 110, in operation S510. That is, if the illuminance sensor 120 senses an illuminance of an area around the camera 110 and transmits information of the sensed illuminance to the microcomputer 80, the microcomputer 80 may adjust an illuminance of the at least one light source 48a installed in the door unit 40 based on the information of the sensed illuminance.

The at least one light source 48a installed in the door unit 40 may include the first, second, and third light sources 48aa, 48ab, and 48ac, as described above, and the first, second, and third light sources 48aa, 48ab, and 48ac may respectively provide light to the spaces S1, S2, and S3 partitioned by the plurality of glass members 43.

The microcomputer 80 may transmit a control signal for turning on the first light source 48aa installed in the door unit 40, and accordingly, the first light source 48aa may be turned on, in operation S515, to provide light to the first space S1 partitioned by the glass members 43.

After the first light source 48aa is turned on, the microcomputer 80 may determine whether an illuminance of the first light source 48aa is higher than the illuminance of the area around the camera 110, in operation S520. If the microcomputer 80 determines that the illuminance of the first light source 48aa is not higher than the illuminance of the area around the camera 110, the microcomputer 80 may transmit a control signal for turning on the second light source 48ab.

The second light source 48*ab* may be turned on according to the control signal for turning on the second light source 48*ab*, transmitted from the microcomputer 80, in operation S525, to provide light to the second space S2 partitioned by the glass members 43. That is, if the illuminance of when only the first light source 48*aa* is turned on is not higher than the illuminance of the area around the camera 110, the microcomputer 80 may additionally turn on the second light source 48*ab* to more brightly control the inside illuminance of the door unit 40.

After the second light source 48*ab* is turned on, the microcomputer 80 may determine whether an illuminance of the first and second light sources 48*aa* and 48*ab* is higher than the illuminance of the area around the camera 110, in operation S530. If the microcomputer 80 determines that the illuminance of when the first and second light sources 48*aa* and 48*ab* are turned on is not higher than the illuminance sensed by the illuminance sensor 120, the microcomputer 80 may transmit a control signal for turning on the third light source 48*ac*.

Then, the third light source 48*ac* may be turned on according to the control signal for turning the third light source 48*ac*, in operation S535, to provide light to the third space S3 partitioned by the glass members 43. That is, if the illuminance of when the first and second light sources 48*aa* and 48*ab* are turned on is not higher than the illuminance of the area around the camera 110, the microcomputer 80 may additionally turn on the third light source 48*ac* to more brightly control the inside illuminance of the door unit 40.

The above description relates to an embodiment of sequentially turning on the first light source 48*aa*, the second light source 48*ab*, and the third light source 48*ac* according to the inside illuminance of the door unit 40, however, the order in which the first light source 48*aa*, the second light source 48*ab*, and the third light source 48*ac* are turned on, or the number of light sources are not limited. That is, various embodiments are possible according to the user's settings or the control of the microcomputer 80.

After the third light source 48*ac* is turned on, the microcomputer 80 may determine whether an illuminance of the first light source 48*aa*, the second light source 48*ab*, and the third light source 48*ac* is higher than the illuminance of the area around the camera 110, in operation S540. If the microcomputer 80 determines that the illuminance of when the first light source 48*aa*, the second light source 48*ab*, and the third light source 48*ac* are turned on is not higher than the illuminance sensed by the illuminance sensor 120, the microcomputer 80 may again set illuminances of the first, second, and third light sources 48*aa*, 48*ab*, and 48*ac* to a value that is higher than the illuminance sensed by the illuminance sensor 120, in operation S545.

The microcomputer 80 may change the illuminances of the first, second, and third light sources 48*aa*, 48*ab*, and 48*ac* according to a setting value, and determine whether the illuminance of the first, second, and third light sources 48*aa*, 48*ab*, and 48*ac* turned on in the inside of the door unit 40 is higher than the illuminance of the area around the camera 110, based on the changed illuminance value, in operation S550. If the microcomputer 80 determines that the illuminance of the first light source 48*aa*, the second light source 48*ab*, and the third light source 48*ac* turned on in the inside of the door unit 40 is not higher than the illuminance sensed by the illuminance sensor 120, the microcomputer 80 may again set illuminances of the first, second, and third light sources 48*aa*, 48*ab*, and 48*ac* to a value that is higher than the illuminance sensed by the illuminance sensor 120.

If the microcomputer 80 determines that the illuminance of the first, second, and third light sources 48*aa*, 48*ab*, and 48*ac* is higher than the illuminance sensed by the illuminance sensor 120, the microcomputer 80 may control the camera 110 to photograph the inside of the cooking chamber 20 to acquire image information of food accommodated in the cooking chamber 20, in operation S555.

After the camera 110 photographs the inside of the cooking chamber 20, the status indicator 54 informing whether the camera 110 operates properly may be turned off, in operation S560. Also, after the camera 110 photographs the inside of the cooking chamber 20, the at least one light source 48*a* installed in the inside of the door unit 40 may be also turned off, in operation S565. Times at which the status indicator 54 and the light source 48*a* are turned on/off may be set by the user, as described above.

The microcomputer 80 may control the communication board 135 to transmit image information of the inside of the cooking chamber 20 acquired by the camera 110 to the external device, and the image information of the inside of the cooking chamber 20 may be transmitted to the external device through a network, in operation S570.

The user may check a cooking state of food accommodated in the inside of the cooking chamber 20 based on the image information received through the external device, and input a control command related to the control of the oven 1 through the external device.

The communication board 135 of the oven 1 may receive information related to the control of the oven 1, set by the user through the external device, through the network, in operation S575.

The microcomputer 80 may control operations of the oven 1 based on control information received by the communication board 135, in operation S580. More specifically, the microcomputer 80 may control cooking of food accommodated in the oven 1 according to a time or temperature set by the user.

As such, since the user can control cooking of food through the external device based on image information of the food photographed by the camera 1, the user can control the oven 1 conveniently even when he/she is distant from the oven 1.

Hereinafter, an installation structure of a camera module according to another embodiment of the present disclosure will be described. The remaining components of an oven except for a configuration which will be described below are the same as the corresponding ones according to the above-described embodiment of the present disclosure, and accordingly, detailed descriptions thereof will be omitted.

Figure 26:
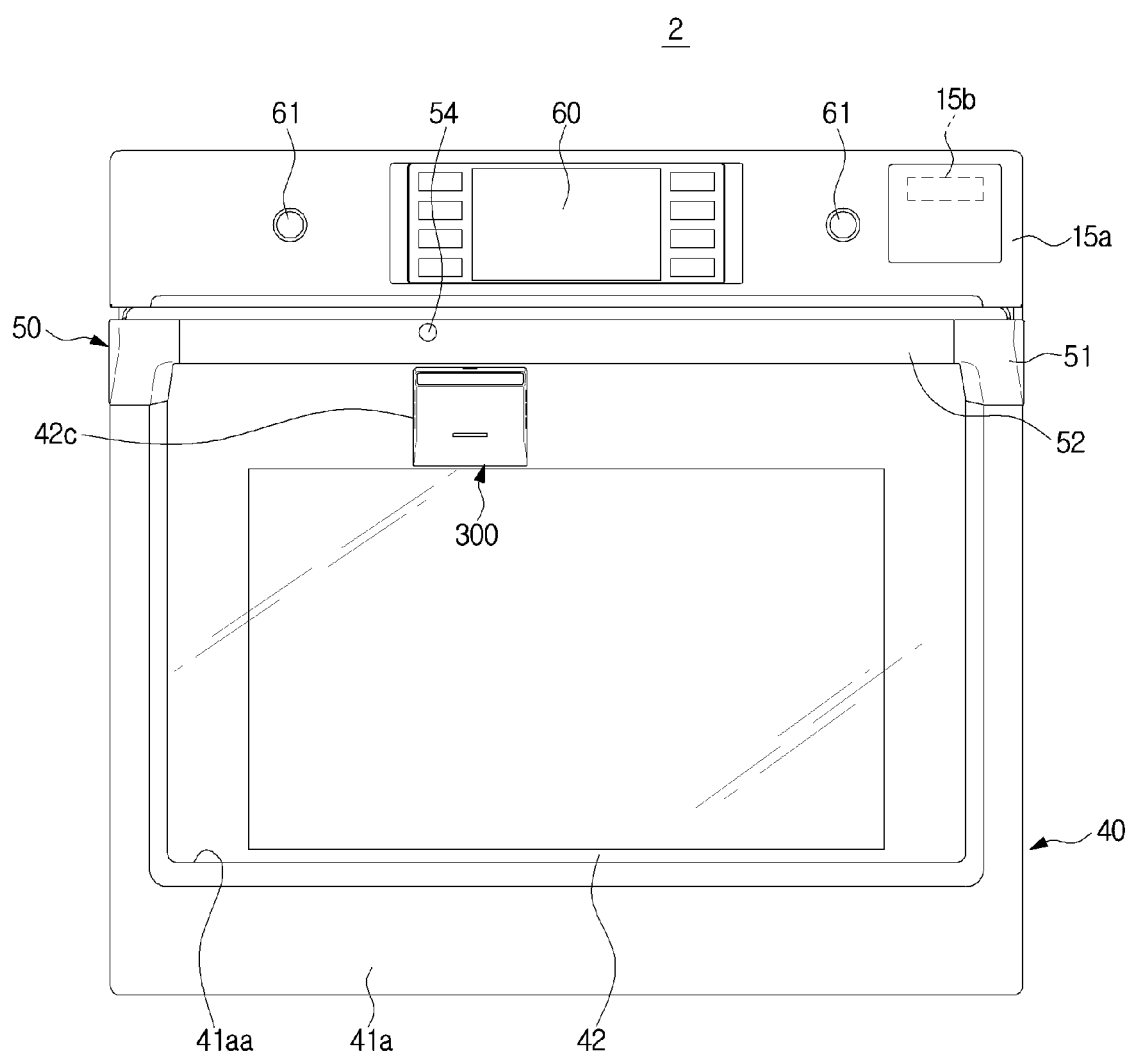
FIG. 26 shows a front view of an oven according to another embodiment of the present disclosure.
Figure 27:
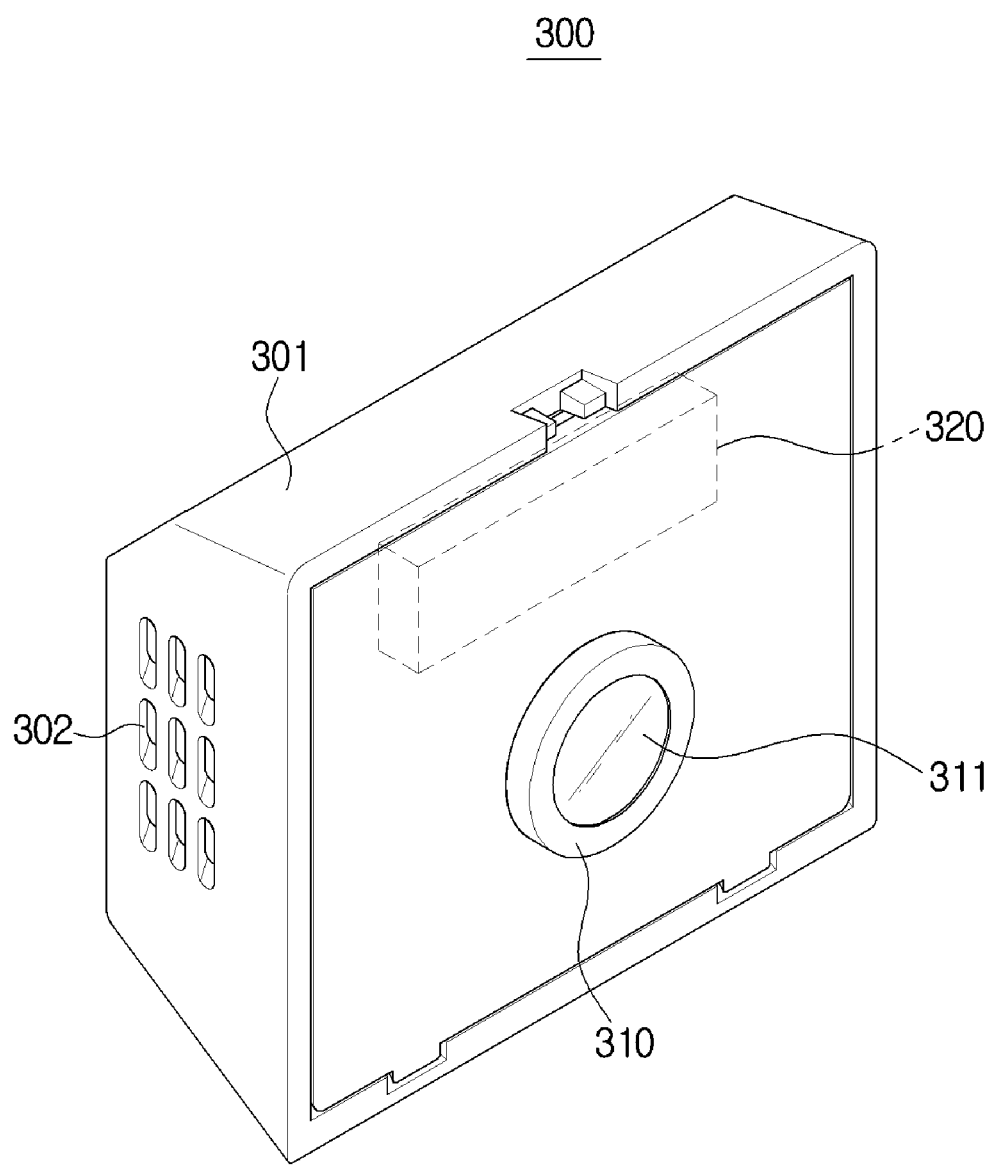
FIG. 27 is a perspective view showing a rear part of a camera module shown in FIG. 26.

FIG. 26 shows a front view of an oven according to another embodiment of the present disclosure. FIG. 27 is a perspective view showing a rear part of a camera module shown in FIG. 26.

In an oven 2 according to another embodiment of the present disclosure, a camera module 300 may be removably coupled with the door unit 40.

More specifically, the camera module 300 may be installed in a first camera module installing unit 42*c* provided in the door unit 40 in order to photograph the inside of the cooking chamber 20. When the camera module 300 does not photograph the inside of the cooking chamber 20, the camera module 300 may be installed in a second camera module installing unit 15*a* to be stored therein. That is, the camera module 300 may be installed at different locations depending on whether or not it is used.

Referring to FIG. 27, the camera module 300 may include a camera 310 to photograph the inside of the cooking chamber 20. A lens 311 of the camera 310 may face the cooking chamber 20, and may be disposed in consideration of the photographing area of the camera 310 such that it can photograph the entire inside of the cooking chamber 20, as in the above-described embodiments. Also, the camera 310 may be rotatable, as in the above-described embodiments. Accordingly, the camera 310 may be tilted in the up, down, left, and right directions so as to photograph the inside of the cooking chamber 20 at various angles.

Also, the camera module 310 may be installed in the inside of the housing 301, and include a magnet 320 to generate a magnetic force for enabling the camera module 300 to be installed in the first camera module installing unit 42c and/or the second camera module installing unit 15a which will be described later. The magnet 320 of the camera module 300 may be disposed at a location corresponding to a magnet 15b provided in the first camera module installing unit 42c and/or the second camera module installing unit 15a so that the camera module 300 can be installed in the first camera module installing unit 42c and/or the second camera module installing unit 15a by a magnetic force.

The camera module 300 may include at least one vent 302. More specifically, the at least one vent 302 may circulate inside air of the housing 301 of the camera module 300 with outside air to release heat generated in the camera 310 to the outside. In order to circulate the air, a fan (not shown) for circulating air may be disposed in the inside of the housing 301 of the camera module 300.

The door unit 40 may include the first camera module installing unit 42c at a location biased toward one end of the handle 50 from the center in longitudinal direction of the handle 50 so that the camera module 300 can be installed in the door unit 40 when the camera module 300 is used. The first camera module installing unit 42c may be formed with a size corresponding to the size of the camera module 30 so that the camera module 300 can be removable coupled with the first camera module installing unit 42c. Each of the camera module 300 and the first camera module installing unit 42c may include the magnet 320, and according to the configuration, the camera module 300 may be removably coupled with the first camera module installing unit 42c by a magnetic force. However, a method in which the camera module 300 is removably coupled with the first camera module installing unit 42c is not limited to this. That is, the camera module 300 may be removably coupled with the first camera module installing unit 42c by another method, such as hook connection or screw fastening.

The machine room cover 15 may include, at its one edge, the second camera module installing unit 15a in which the camera module 300 can be removably installed, in order to store the camera module 300 when the camera module 300 is not used. The second camera module installing unit 15a may be formed in the shape of a groove in the machine room cover 15, wherein the size of the second camera module installing unit 15a may correspond to the size of the camera module 300. In FIG. 26, an example in which the second camera module installing unit 15a is formed in the right part of the machine room cover 15 is shown, however, the second camera module installing unit 15a may be formed in the left part of the machine room cover 15 or in one side panel 13 of the case 10.

The second camera module installing unit 15a may include the magnet 15b corresponding to the magnet 320 of the camera module 300 and enabling the camera module 300 to be installed in the second camera module installing unit 15a. According to the configuration, the camera module 300 can be easily installed in and separated from the second camera module installing unit 15a.

According to the configuration, when the camera module 300 is used, the camera module 300 may be installed in the first camera module installing unit 42c of the door unit 40, and when the camera module 300 is not used, the camera module 300 may be stored in the second camera module installing unit 15a of the machine room cover 15 so as to be prevented from being unnecessarily exposed to heat from the cooking chamber 20 and damaged.

Hereinafter, a structure of a camera module according to another embodiment of the present disclosure will be described. The remaining components of an oven except for a configuration which will be described below are the same as the corresponding ones according to the above-described embodiment of the present disclosure, and accordingly, detailed descriptions thereof will be omitted.

Figure 28:
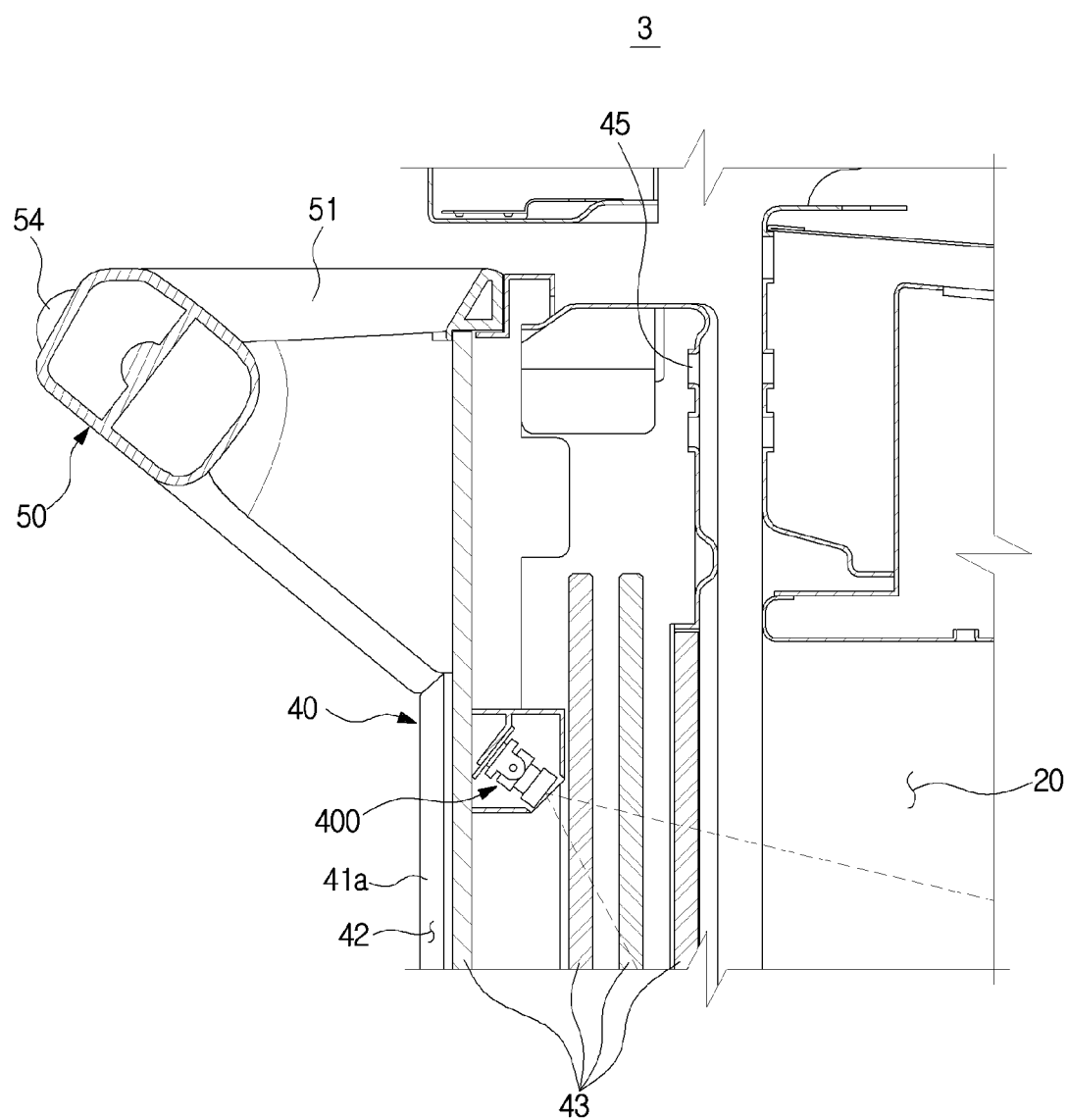
FIG. 28 is a side cross-sectional view of an oven according to another embodiment of the present disclosure.
Figure 29:
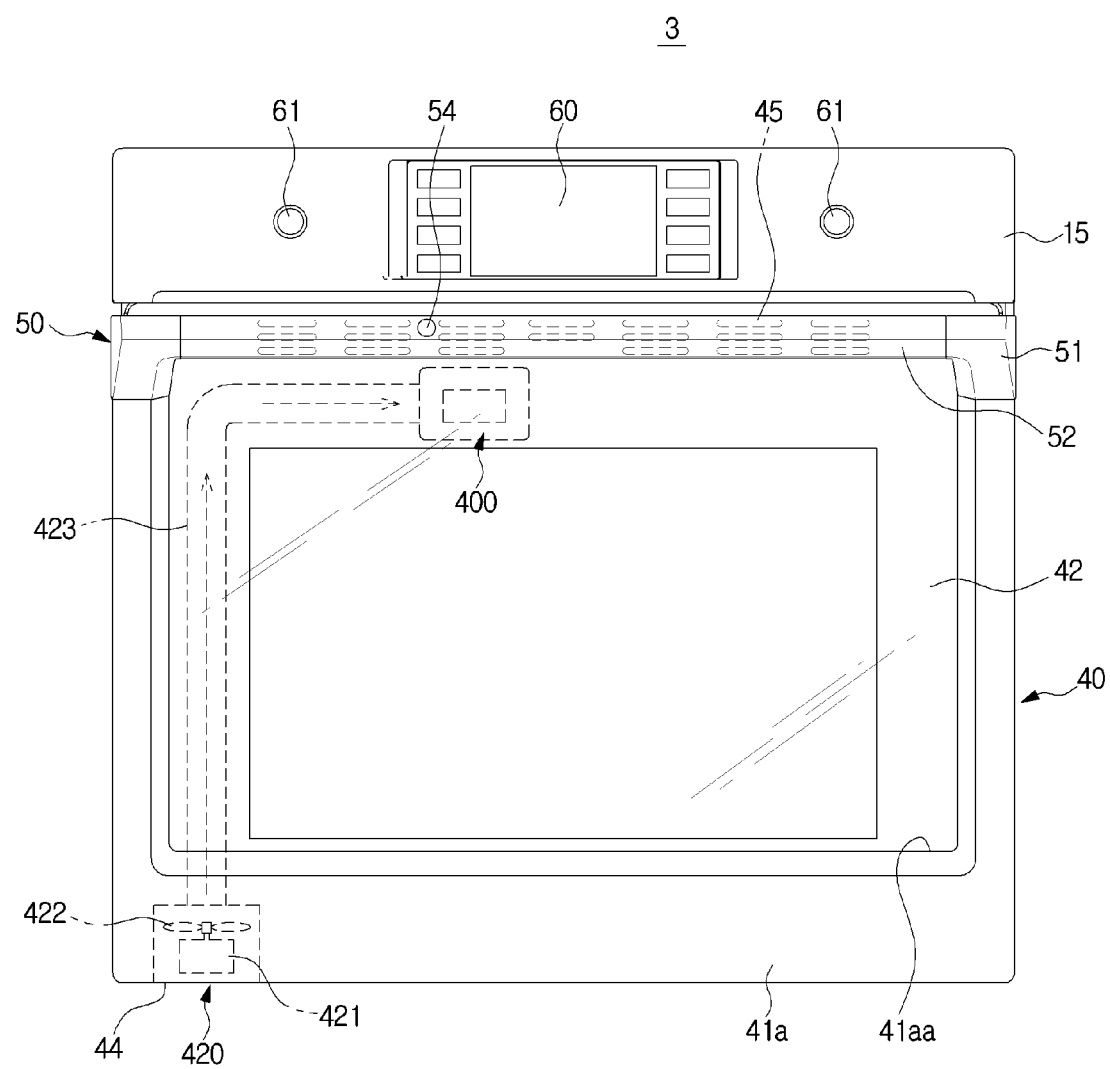
FIG. 29 is a front view of the oven shown in FIG. 28.

FIG. 28 is a side cross-sectional view of an oven according to another embodiment of the present disclosure. FIG. 29 is a front view of the oven shown in FIG. 28.

In an oven 3 according to another embodiment of the present disclosure, a camera module 400 may be installed in the inside of the door unit 40. More specifically, the camera module 400 may be disposed in a space between the plurality of glass members 43 of the door unit 40.

In this case, since the camera module 400 is positioned relatively adjacent to the cooking chamber 20, the camera module 400 may be damaged by heat generated in the inside of the cooking chamber 20. In order to prevent the camera module 400 from being damaged, a cooling module 420 for cooling the camera module 400 may be installed in the door unit 40. The cooling module 420 may include a cooling driving source 421, a cooling fan 422, and a cooling passage 423.

More specifically, the cooling module 420 may forcedly supply outside air to the camera module 400 through the cooling driving source 421 and the cooling fan 422 disposed in the lower end of the door unit 40. The door unit 40 may include the door inlet port 44 formed in the lower end of the door unit 40, and the door outlet port 45 formed in the upper end of the door unit 40, as shown in FIG. 3, and the cooling driving source 421 and the cooling fan 422 may be positioned adjacent to the door inlet port 44.

The cooling passage 423 may extend from the door inlet port 44 to the camera module 400. More specifically, outside air may flow to the cooling passage 423 through the door inlet port 44 by a suction force of the cooling driving source 421 and the cooling fan 422, and the outside air flowed to the cooling passage 423 may be guided to the camera module 400. The outside air guided to the camera module 400 may cool the camera module 400, and then be discharged to the outside through the door outlet port 45 formed in the rear part of the door unit 40.

According to the configuration, since the camera module 400 can be installed in the inside of the door unit 40, the outer appearance of the oven 3 can be improved. Also, by forcedly circulating outside air to cool the camera module 400, the cooling effect can be enhanced to prevent the camera module 400 from being damaged by heat, and to ensure product reliability.

As described above, since the oven according to the present disclosure includes the camera module, a user can check a cooking process through the camera module without having to look into the transparent portion of the oven or to open the door unit, which leads to the user's convenience.

Also, in the oven according to the present disclosure, since the camera module is installed in the handle spaced from the door unit, the camera module can be prevented from being damaged by heat from the inside of the cooking chamber.

Also, in the oven according to the present disclosure, since the camera module is biased toward one end of the handle from the center in longitudinal direction of the handle, and in a depression from the outer surface of the handle, the camera module can be prevented from being contaminated (made dirty) by a user's hand.

Also, in the oven according to the present disclosure, since the anti-reflection coating layer or the mirror glass coating layer is formed on the transparent portion of the door unit, the camera module can clearly photograph the inside of the cooking chamber.

Also, in the oven according to the present disclosure, since the cable unit electrically connecting the camera module to the microcomputer can be separated at a connection part between the handle and the door unit and at a connection part between the door unit and the case, an enhanced assembly can be obtained, resulting in easy maintenance and repair of the oven.

Also, in the oven according to the present disclosure, by sensing an illuminance of an area around the camera to brightly control an illuminance of the light source installed and turned on/off in the inside of the door unit of the oven according to the sensed illuminance, the camera can acquire a clear image of the inside of the cooking chamber and provide the clear image to a user.

Also, in the oven according to the present disclosure, since image information of the inside of the cooking chamber acquired by the camera is transmitted to an external device through a network, a user can intuitively check the image information, and input a command related to the control of the oven through the external device to control cooking of food accommodated in the oven conveniently even when he/she is distant from the oven.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An oven comprising:
    a case having a cooking chamber therein;
    a door unit connected to the case, configured to open or close the cooking chamber, and having a transparent portion which enables viewing inside of the cooking chamber;
    a handle which protrudes from the door unit toward outside of the case; and
    a camera module provided in the handle, configured to photograph the inside of the cooking chamber, and disposed to be biased by a predetermined distance from a center area of the handle in a longitudinal direction of the handle so that the camera module is biased toward one end of the handle,
    wherein the transparent portion comprises a mirror glass coating layer.
2. The oven according to claim 1, wherein the camera module is positioned in a depression in an outer surface of the handle.
3. The oven according to claim 1, wherein the door unit comprises a light source installed inside of the door unit.
4. The oven according to claim 1, wherein the transparent portion comprises an anti-reflection coating layer.
5. The oven according to claim 1, wherein the mirror glass coating layer comprises a masking portion subject to a masking process at an area corresponding to a photographing area which is photographed by the camera module.
6. The oven according to claim 1, further comprising:
    a microcomputer configured to control the camera module, and provided in the case; and
    a cable unit which electrically connects the camera module to the microcomputer,
    wherein the cable unit comprises:
    a first cable which extends from the camera module to a first separation area at which the handle is separated from the door unit;
    a second cable which extends from the first separation area to a second separation area at which the door unit is separated from the case; and
    a third cable which extends from the second separation area to the microcomputer.
7. The oven according to claim 1, further comprising:
    a microcomputer configured to control the camera module; and
    a cable unit which electrically connects the camera module to the microcomputer,
    wherein the cable unit is shielded with a heat-resisting material.
8. The oven according to claim 1, wherein the camera module is disposed lower than a top end of the transparent portion.
9. The oven according to claim 1, wherein the camera module comprises a camera configured to photograph the inside of the cooking chamber, and an illuminance sensor configured to measure an illuminance around the camera module.
10. An oven comprising:
    a door unit configured to open or close a cooking chamber;
    at least one light source provided inside of the door unit;
    a handle which protrudes from the door unit toward an outside of the oven;
    a camera provided in the handle, and configured to photograph the inside of the cooking chamber to acquire image information of the inside of the cooking chamber;
    an illuminance sensor configured to sense an illuminance of an area in a range of a predetermined distance from the camera; and
    a microcomputer configured to adjust an illuminance of the at least one light source based on the illuminance sensed by the illuminance sensor to adjust a brightness of the inside of the door unit.
11. The oven according to claim 10, wherein the microcomputer sets an illuminance of the at least one light source to a value that is higher than the illuminance sensed by the illuminance sensor.
12. The oven according to claim 10, further comprising a communication board configured to transmit the image information of the inside of the cooking chamber to an external device.
13. The oven according to claim 12, wherein:
    the communication board receives information related to control of the oven, set by the external device, and
    the microcomputer controls operation of the oven, based on the information related to the control of the oven, received from the external device.
14. The oven according to claim 10, wherein the camera is disposed to be biased by a predetermined distance from a center area of the handle in a longitudinal direction of the handle so that the camera is biased toward one end of the handle.

15. The oven according to claim 10, wherein the camera is in a depression in an outer surface of the handle, and installed inside of the handle.

16. The oven according to claim 10, wherein the illuminance sensor is spaced a predetermined distance from the camera.

17. The oven according to claim 10, further comprising a storage unit configured to store illuminance information sensed by the illuminance sensor.

18. The oven according to claim 17, wherein the storage unit stores the image information acquired by the camera.

19. The oven according to claim 10, further comprising a status indicator disposed in the door unit, and configured to be turned on before the camera photographs the inside of the cooking chamber and to be turned off after the camera photographs the inside of the cooking chamber.

20. A method of controlling an oven, the oven including a door unit configured to open or close a cooking chamber, a handle provided on an outside of the door unit, and a camera module provided on the handle and offset approximately eighty millimeters from a center of the handle towards an end of the handle, the method comprising:
    receiving a control signal for photographing an inside of the cooking chamber using the camera module including a camera;
    sensing an illuminance of an area in a range of a predetermined distance from the camera;
    adjusting an illuminance of at least one light source provided inside of the door unit, based on the sensed illuminance;
    photographing the inside of the cooking chamber based on the adjusted illuminance of the at least one light source to acquire image information of the inside of the cooking chamber; and
    transmitting the image information of the inside of the cooking chamber to an external device.

21. The method according to claim 20, wherein the adjusting of the illuminance of the at least one light source comprises setting the illuminance of the at least one light source to a value that is higher than the sensed illuminance.

22. The method according to claim 20, further comprising receiving information related to control of the oven, set by the external device, and controlling operation of the oven based on the received information related to the control of the oven.

23. An oven comprising:
    a case having a cooking chamber therein;
    a door unit connected to the case, configured to open or close the cooking chamber, and having a transparent portion which enables viewing an inside of the cooking chamber;
    a handle which protrudes from the door unit toward an outside of the case; and
    a camera module provided in the handle, configured to photograph the inside of the cooking chamber, disposed to be in a depression in an outer surface of the handle, and disposed to be biased approximately eighty millimeters toward one end of the handle from a center area of the handle in a longitudinal direction of the handle.

* * * * *